(12) United States Patent
Shi et al.

(10) Patent No.: US 9,375,880 B2
(45) Date of Patent: Jun. 28, 2016

(54) RAPID PROTOTYPING APPARATUS WITH PAGE-WIDTH ARRAY PRINTING MODULE

(71) Applicant: MICROJET TECHNOLOGY CO., LTD., Hsinchu (TW)

(72) Inventors: Kwo-Yuan Shi, Hsinchu (TW);
Ke-Ming Huang, Hsinchu (TW);
Chi-Feng Huang, Hsinchu (TW);
Yung-Lung Han, Hsinchu (TW)

(73) Assignee: MICROSOFT TECHNOLOGY CO., LTD., Hsinchu (TW)

( * ) Notice: Subject to any disclaimer, the term of this patent is extended or adjusted under 35 U.S.C. 154(b) by 63 days.

(21) Appl. No.: 14/473,588

(22) Filed: Aug. 29, 2014

(65) Prior Publication Data

US 2015/0079213 A1 Mar. 19, 2015

(30) Foreign Application Priority Data

Sep. 13, 2013 (TW) ............................... 102133152 A

(51) Int. Cl.
*B29C 67/00* (2006.01)
*B33Y 50/02* (2015.01)
*B29K 105/00* (2006.01)

(52) U.S. Cl.
CPC ......... *B29C 67/0059* (2013.01); *B29C 67/0085* (2013.01); *B29C 67/0088* (2013.01); *B33Y 50/02* (2014.12); *B29K 2105/0032* (2013.01); *B29K 2105/0058* (2013.01)

(58) Field of Classification Search
CPC ............ B29C 67/0059; B29C 67/0085; B29C 67/0088; B29K 2105/0032; B29K 2105/0058; B33Y 50/02
See application file for complete search history.

(56) References Cited

U.S. PATENT DOCUMENTS

| 6,007,318 | A | 12/1999 | Russell et al. |
| 2004/0141018 | A1* | 7/2004 | Silverbrook ............ B22F 3/008 347/4 |
| 2006/0054039 | A1* | 3/2006 | Kritchman .............. B29C 41/02 101/424.1 |
| 2006/0127153 | A1* | 6/2006 | Menchik ............. B29C 67/0059 400/62 |
| 2011/0032301 | A1 | 2/2011 | Fienup et al. |

(Continued)

FOREIGN PATENT DOCUMENTS

| JP | 7-276638 | 10/1995 |
| JP | 2006-27015 | 2/2006 |

(Continued)

*Primary Examiner* — Yogendra Gupta
*Assistant Examiner* — Emmanuel S Luk
(74) *Attorney, Agent, or Firm* — Kirton McConkie; Evan R. Witt

(57) ABSTRACT

A rapid prototyping apparatus includes a construction platform, a movable platform, and a page-width array printing module. The construction platform includes a construction chamber. The movable platform and the construction platform are movable relative to each other. The page-width array printing module includes plural inkjet head structures. The printing platform and the movable platform are synchronously moved along a single direction in a reciprocating motion. The plural inkjet head structures are collaboratively defined as at least one page-width array printing unit. The plural inkjet head structures include respective inkjet chips. The inkjet chips are arranged in plural rows and in a staggered form, so that a printing width of the inkjet chips is larger than or equal to a width of a printed pattern. Moreover, at least one monochromatic print liquid is introduced into the construction chamber from the plural inkjet head structures.

30 Claims, 25 Drawing Sheets

(56) References Cited

U.S. PATENT DOCUMENTS

| | | | |
|---|---|---|---|
| 2011/0215506 A1* | 9/2011 | Okamoto | B29C 35/08 264/401 |
| 2015/0173203 A1* | 6/2015 | Din | H05K 3/108 425/132 |
| 2015/0174824 A1* | 6/2015 | Gifford | B29C 67/0085 425/183 |
| 2015/0183163 A1* | 7/2015 | Beak | B29C 67/0059 264/496 |
| 2015/0190964 A1* | 7/2015 | Okamoto | B29C 67/0092 428/192 |
| 2015/0336410 A1* | 11/2015 | Weijkamp | B41J 29/38 347/9 |

FOREIGN PATENT DOCUMENTS

| | | |
|---|---|---|
| TW | 274669 | 3/2007 |
| TW | M391475 | 11/2010 |
| TW | 201217182 | 5/2012 |

* cited by examiner

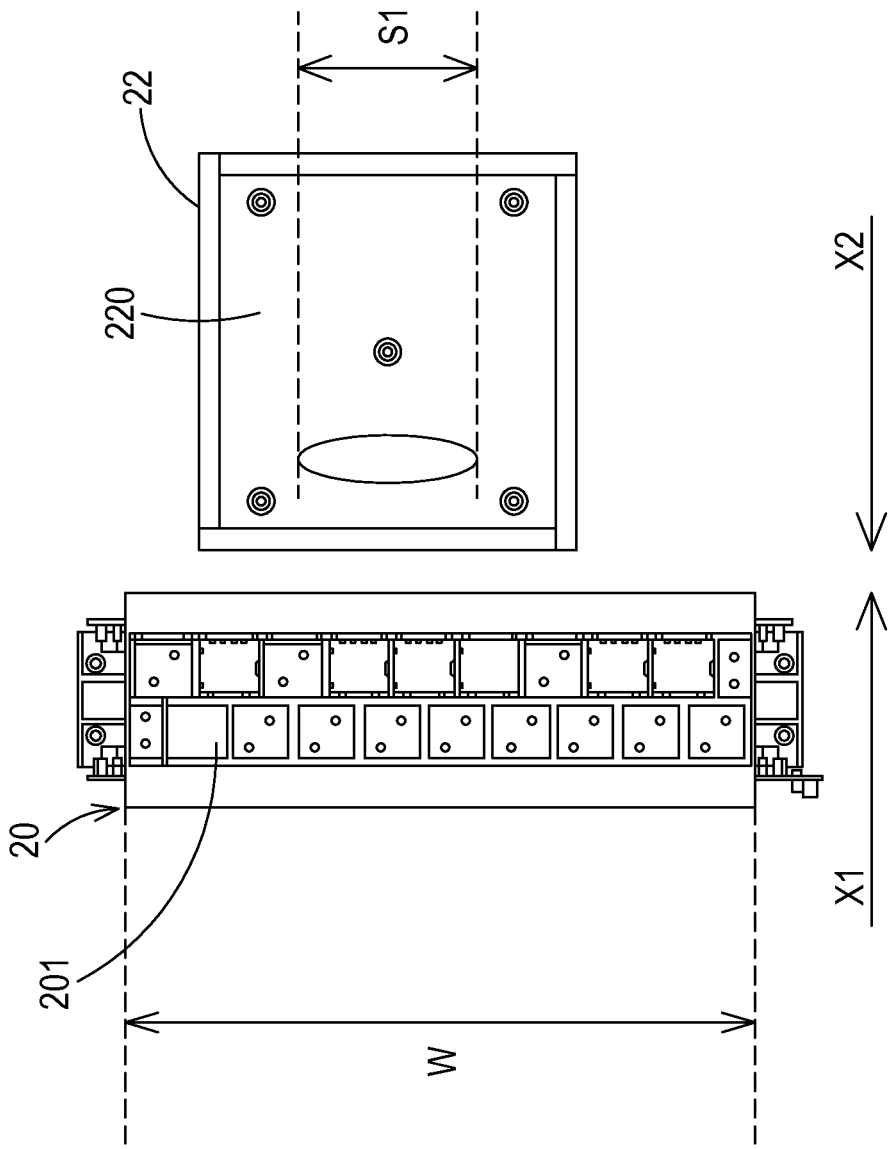

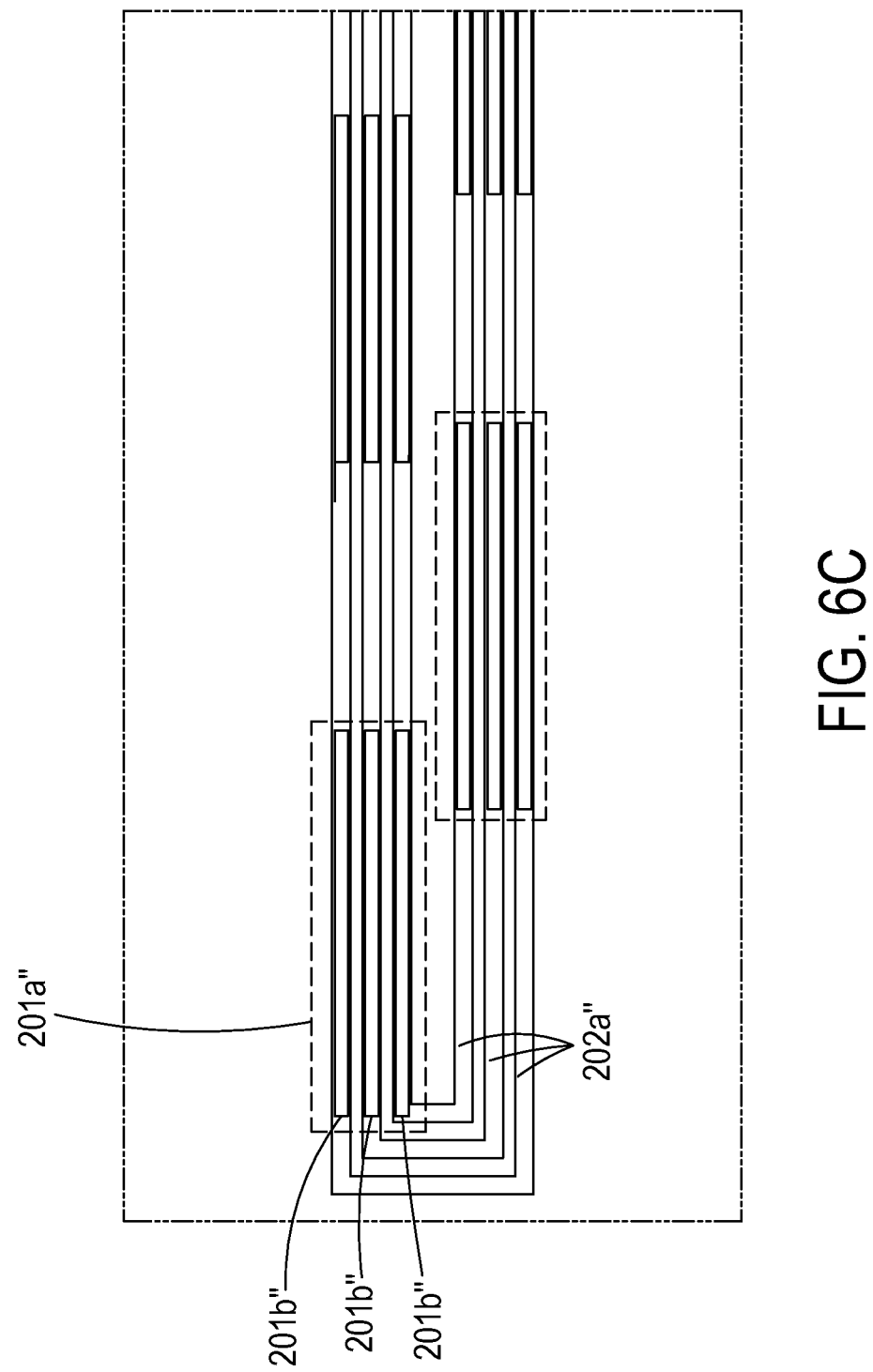

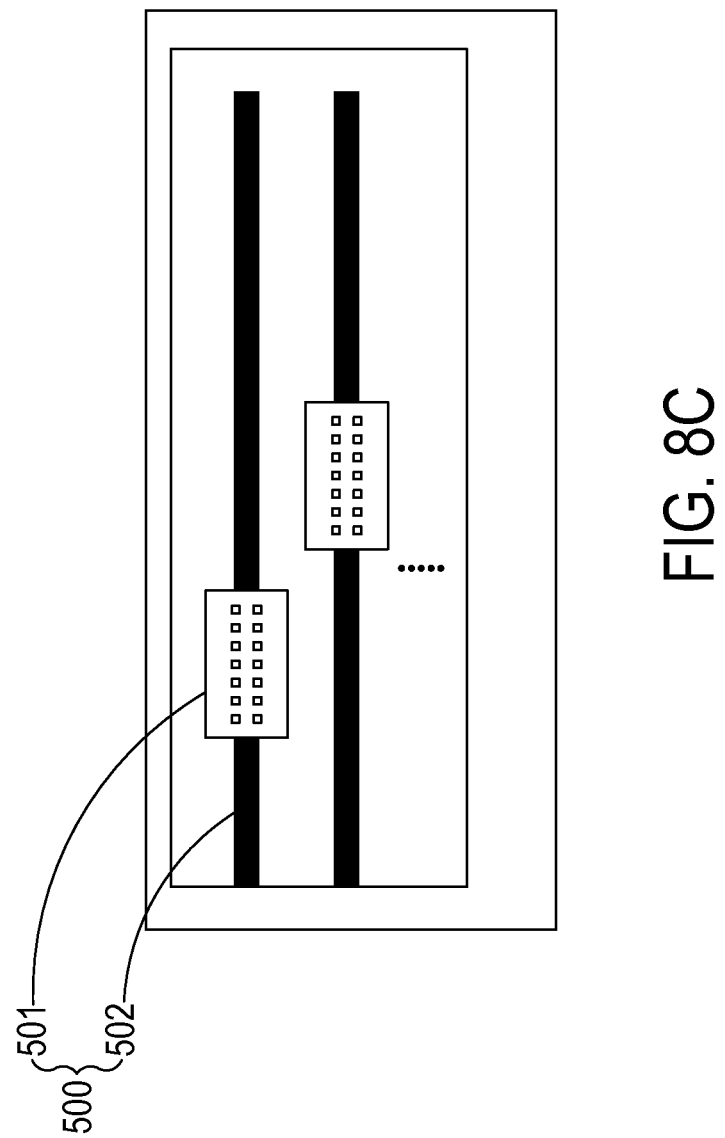

RAPID PROTOTYPING APPARATUS WITH PAGE-WIDTH ARRAY PRINTING MODULE

FIELD OF THE INVENTION

The present invention relates to a rapid prototyping apparatus, and more particularly to a rapid prototyping apparatus with a page-width array printing module.

BACKGROUND OF THE INVENTION

As known, the rapid prototyping (RP) technology is developed from the concepts of forming a pyramid by stacking layers, and the main technical feature is to achieve fast formation. A complicated design can be transformed into a three-dimensional physical model automatically and fast without any cutting tools, molds and fixtures. Thus, the development cycle of new products and research and development cost are largely reduced to ensure the time to market for new products and the first-time-right ratio. Accordingly, a complete and convenient product design tool is provided between technicians and non-technicians (e.g. managers and users), and the product competitiveness and the quick reaction capability of enterprises in the market are improved obviously.

Recently, the rapid prototyping technology develops a method for producing three-dimensional physical models by combining an inkjet printing technology and a precise positioning technology of positioning the carriers. The producing method begins by first spreading a layer of powder on the carrier and then printing high viscosity liquid binder on part of the powder by using the inkjet printing technology, so that the liquid binder and the powder stick together to become solidified. After the above steps are repeatedly done, a three-dimensional physical model is produced by stacking multiple layers.

Conventionally, a printing module using the general inkjet printing technology and the rapid prototyping technology are collaboratively used to produce the three-dimensional physical model. FIG. 1 schematically illustrates the architecture of a printing module using the general inkjet printing technology according to the prior art. As shown in FIG. 1, the printing module 1 using the general inkjet printing technology is installed on a main body (not shown) in order to perform an inkjet printing operation. The printing module 1 comprises an inkjet printing platform 10, a carrying seat 12 and at least one inkjet head structure 11. The inkjet printing platform 10 comprises a bracket 101 and a transmission shaft 102. The transmission shaft 102 is spanned across the bracket 101. The carrying seat 12 is sheathed around the transmission shaft 102. The at least one inkjet head structure 11 is installed on the carrying seat 12. The carrying seat 12 and the at least one inkjet head structure 11 thereon can be moved relative to the transmission shaft 102 of the inkjet printing platform 10 along the Y-axis in a reciprocating motion.

When the printing module 1 performs the inkjet printing operation according to the RP technology, the carrying seat 12 and the at least one inkjet head structure 11 thereon are driven by the inkjet printing platform 10 and thus moved along the X-axis in a reciprocating motion. Moreover, the carrying seat 12 and the at least one inkjet head structure 11 are moved relative to the transmission shaft 102 of the inkjet printing platform 10 from left to right and from right to left along the Y-axis in the reciprocating motion. As the reciprocating motion of the at least one inkjet head structure 11 along the X-axis and the reciprocating motion of the at least one inkjet head structure 11 along the Y-axis are alternately performed, the viscosity liquid binder contained in the inkjet head structure 11 are printed on a construction material (not shown), which is spread by a construction platform (not shown). After the above steps are repeatedly done, a three-dimensional physical model (not shown) is produced by stacking multiple layers.

As mentioned above, the printing module using the general inkjet printing technology may be applied to the rapid prototyping technology in order to produce the three-dimensional physical model. However, the speed of forming the three-dimensional physical model is limited by the process of moving the inkjet head structure 11 along multiple axes (i.e. the X-axis and the Y-axis) to the construction material which is spread by the construction platform. Even if the stacking speed is 2~4 layers per minutes, it takes a very long time (e.g. several hours or longer) to form the large-sized object because the process of moving the inkjet head structure 11 along the multiple axes is very time-consuming.

Moreover, regardless of the size of the three-dimensional physical model or the rapid prototyping apparatus, it usually takes several hours (or longer) to form the three-dimensional physical model. After the three-dimensional physical model is produced by stacking multiple layers, if the inkjet head structure has defects and the defects are not immediately recognized or found, the problems of wasting time and material occur. Moreover, in the conventional inkjet printing method of the rapid prototyping apparatus, a specified pattern indicating all nozzles of the inkjet head structure is printed and the conditions of the nozzles are realized by checking the specified pattern. The manual checking method is labor-intensive and subjective. Moreover, if the number of the abnormal nozzles or the positions of the abnormal nozzles are erroneously judged, the checking efficiency and the checking accuracy are reduced.

As mentioned above, the forming speed and the quality of the three-dimensional object by the conventional rapid prototyping apparatus are still unsatisfied.

Therefore, there is a need of providing a rapid prototyping apparatus with a page-width array printing module in order to produce a three-dimensional object with good quality at a faster speed.

SUMMARY OF THE INVENTION

An object of the present invention provides a rapid prototyping apparatus with a page-width array printing module for producing a three-dimensional object at a faster speed.

Another object of the present invention provides a rapid prototyping apparatus with a page-width array printing module for producing a three-dimensional object with good quality.

In accordance with an aspect of the present invention, there is provided a rapid prototyping apparatus. The rapid prototyping apparatus includes a construction platform, a movable platform, and a page-width array printing module. The construction platform includes a construction chamber. The movable platform is disposed above the construction platform. The movable platform and the construction platform are movable relative to each other, so that a construction material is pushed to the construction chamber. The page-width array printing module includes at least one printing platform and plural inkjet head structures. The printing platform is installed on the movable platform. The printing platform and the movable platform are synchronously moved along a single direction in a reciprocating motion. The plural inkjet head structures are installed on the printing platform and collaboratively defined as at least one page-width array printing unit. The plural inkjet head structures of the page-width array printing unit include respective inkjet chips. The inkjet chips are disposed on the printing platform and arranged in plural rows and in a staggered form, so that a printing width of the inkjet chips is larger than or equal to a width of a printed pattern. Moreover, at least one monochromatic print liquid is introduced into the construction chamber from the plural inkjet head structures, so that a rapid prototyping width-page printing operation is performed.

In accordance with another aspect of the present invention, there is provided a rapid prototyping apparatus. The rapid prototyping apparatus includes a construction platform, a movable platform, and a page-width array printing module. The construction platform includes a construction chamber. The movable platform is disposed above the construction platform for pushing a construction material to the construction chamber. The page-width array printing module includes at least one printing platform and plural inkjet head structures. The page-width array printing module and the construction chamber are movable relative to each other so as to perform a rapid prototyping width-page printing operation. The printing platform is installed on the movable platform. The plural inkjet head structures are installed on the printing platform and collaboratively defined as at least one page-width array printing unit. The plural inkjet head structures of the page-width array printing unit include respective inkjet chips. The inkjet chips are disposed on the printing platform and arranged in plural rows and in a staggered form, so that a printing width of the inkjet chips is larger than or equal to a width of a printed pattern. A monochromatic print liquid is introduced into the construction chamber from the plural inkjet head structures, so that the rapid prototyping width-page printing operation is performed.

The above contents of the present invention will become more readily apparent to those ordinarily skilled in the art after reviewing the following detailed description and accompanying drawings, in which:

BRIEF DESCRIPTION OF THE DRAWINGS

FIG. 2A is a schematic top view illustrating the relationship between a page-width array printing module and a construction chamber of a rapid prototyping apparatus according to an embodiment of the present invention;

FIG. 6C is a schematic enlarged fragmentary bottom view illustrating the page-width array printing module of FIG. 6B;

FIG. 8C is a schematic view illustrating a dynamic compensation module for performing the compensation printing operation according to an embodiment of the present invention.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
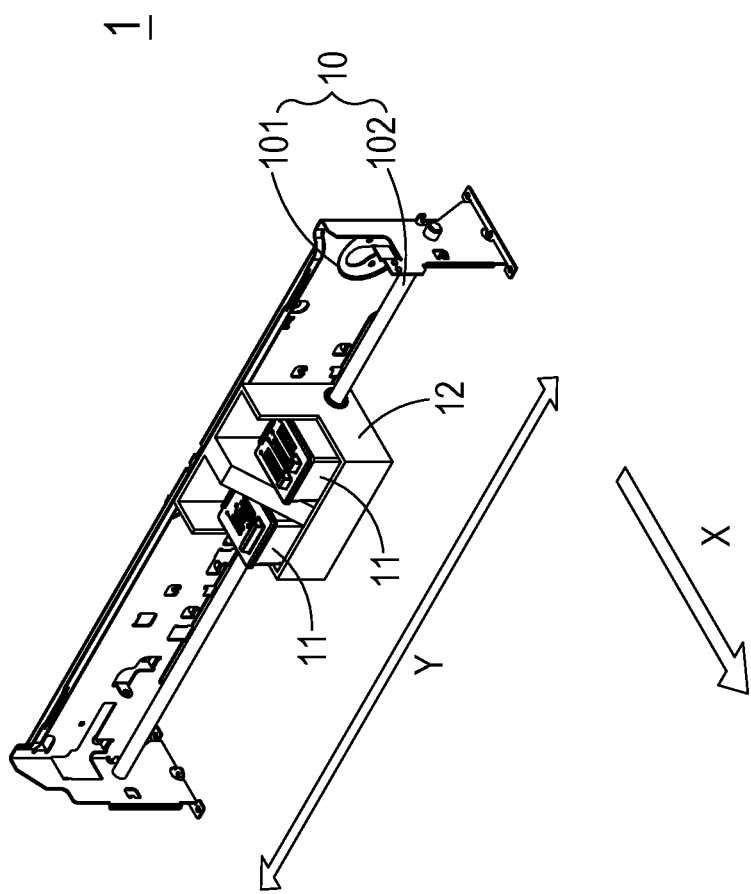
FIG. 1 schematically illustrates the architecture of a printing module using the general inkjet printing technology according to the prior art.
Figure 2B:
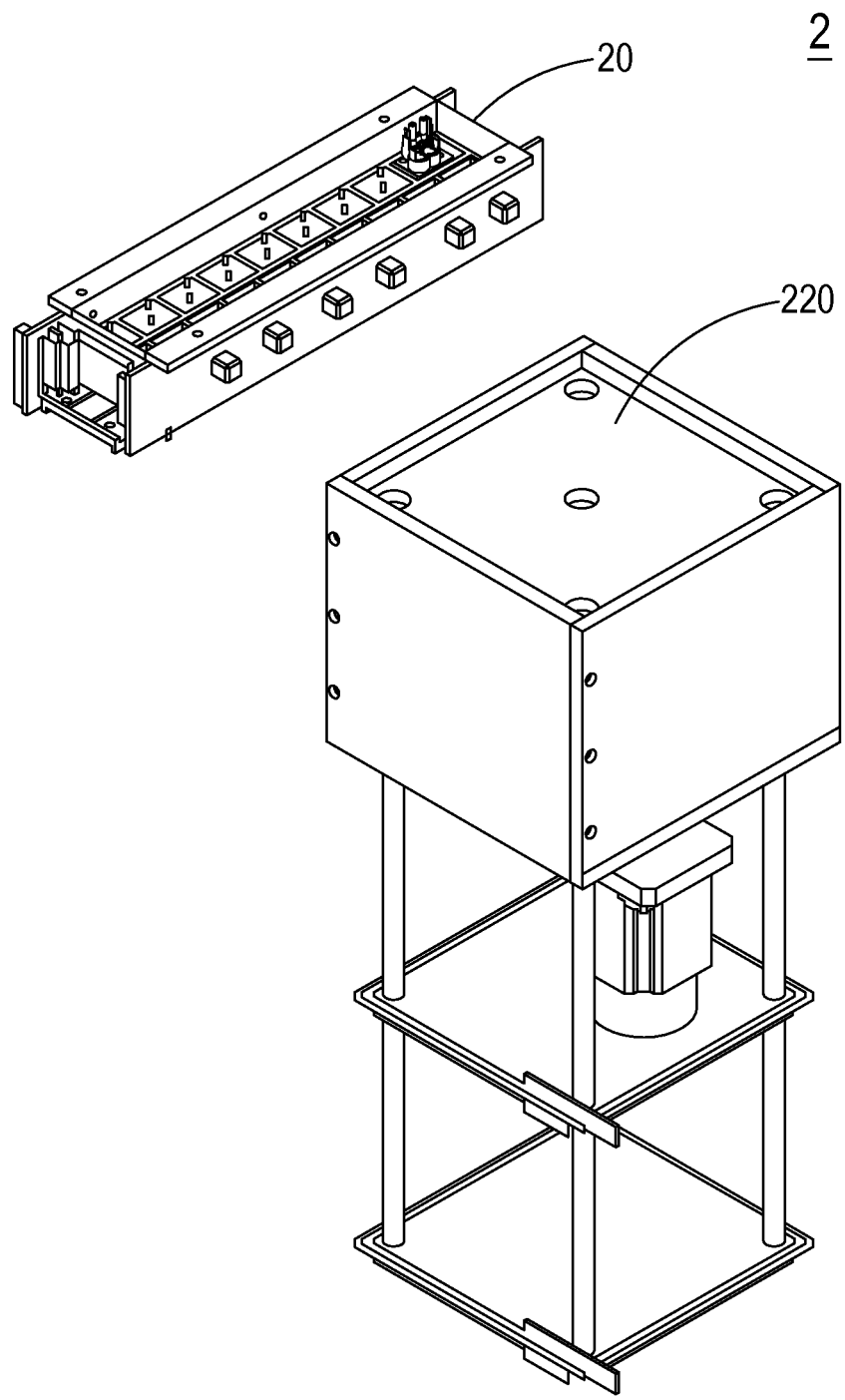
FIG. 2B is a schematic perspective view illustrating the relationship between the page-width array printing module and the construction chamber of the rapid prototyping apparatus of FIG. 2A.

FIG. 2A is a schematic top view illustrating the relationship between a page-width array printing module and a construction chamber of a rapid prototyping apparatus according to an embodiment of the present invention. FIG. 2B is a schematic perspective view illustrating the relationship between the page-width array printing module and the construction chamber of the rapid prototyping apparatus of FIG. 2A. As shown in FIGS. 2A and 2B, the rapid prototyping apparatus 2 comprises a page-width array printing module 20 and a construction chamber 220 (see also FIG. 3A). The page-width array printing module 20 comprises plural inkjet head structures 201. The construction chamber 220 is installed in a construction platform 22. While the page-width array printing module 20 performs a rapid prototyping width-page printing operation, the page-width array printing module 20 is moved relative to the construction platform 22. That is, the page-width array printing module 20 is moved horizontally along a direction X1. When the page-width array printing module 20 is moved to the position over the construction chamber 220 of the construction platform 22, the rapid prototyping width-page printing operation is performed in the construction chamber 220 by the page-width array printing module 20. Since the page-width array printing module 20 comprises the plural inkjet head structures 201, the overall printing width W of the plural inkjet head structures 201 is larger than or equal to the width S1 of a printed pattern. Consequently, during the process of performing the rapid prototyping width-page printing operation, the page-width array printing module 20 is moved along a single axis (i.e. the X-direction). That is, it is not necessary to move the page-width array printing module 20 along the Y-axis. Under this circumstance, the printing speed and the printing efficiency are both enhanced.

As mentioned above, the page-width array printing module 20 is moved relative to the construction platform 22 along the direction X1. It is noted that numerous modifications may be mode while retaining the teachings of the present invention. For example, in another embodiment, the construction platform 22 may be horizontally moved relative to the page-width array printing module 20 along a direction X2 (see FIG. 2A). When the construction chamber 220 is moved by the construction platform 22 to be moved to the position under the page-width array printing module 20, the rapid prototyping width-page printing operation is performed in the construction chamber 220 by the page-width array printing module 20. Alternatively, in another embodiment, the page-width array printing module 20 and the construction platform 22 are moved relative to each other along the directions X1 and X2, respectively. When the page-width array printing module 20 is moved to the position over the construction chamber 220 of the construction platform 22, the rapid prototyping width-page printing operation is performed in the construction chamber 220 by the page-width array printing module 20.

As mentioned above, the page-width array printing module 20 may be moved relative to the construction platform 22, the construction platform 22 may be moved relative to the page-width array printing module 20, or the page-width array printing module 20 and the construction platform 22 are moved relative to each other. In other words, the page-width array printing module 20 and/or the construction platform 22 is moved along a single axis (i.e. the X-axis) while performing the rapid prototyping width-page printing operation. In comparison with the conventional technology, it is not necessary to move the page-width array printing module 20 and/or the construction platform 22 along another axis (i.e. the Y-axis) when the rapid prototyping width-page printing operation of the present invention is performed. Consequently, the printing speed and the printing efficiency of the present invention are both enhanced.

Figure 3A:
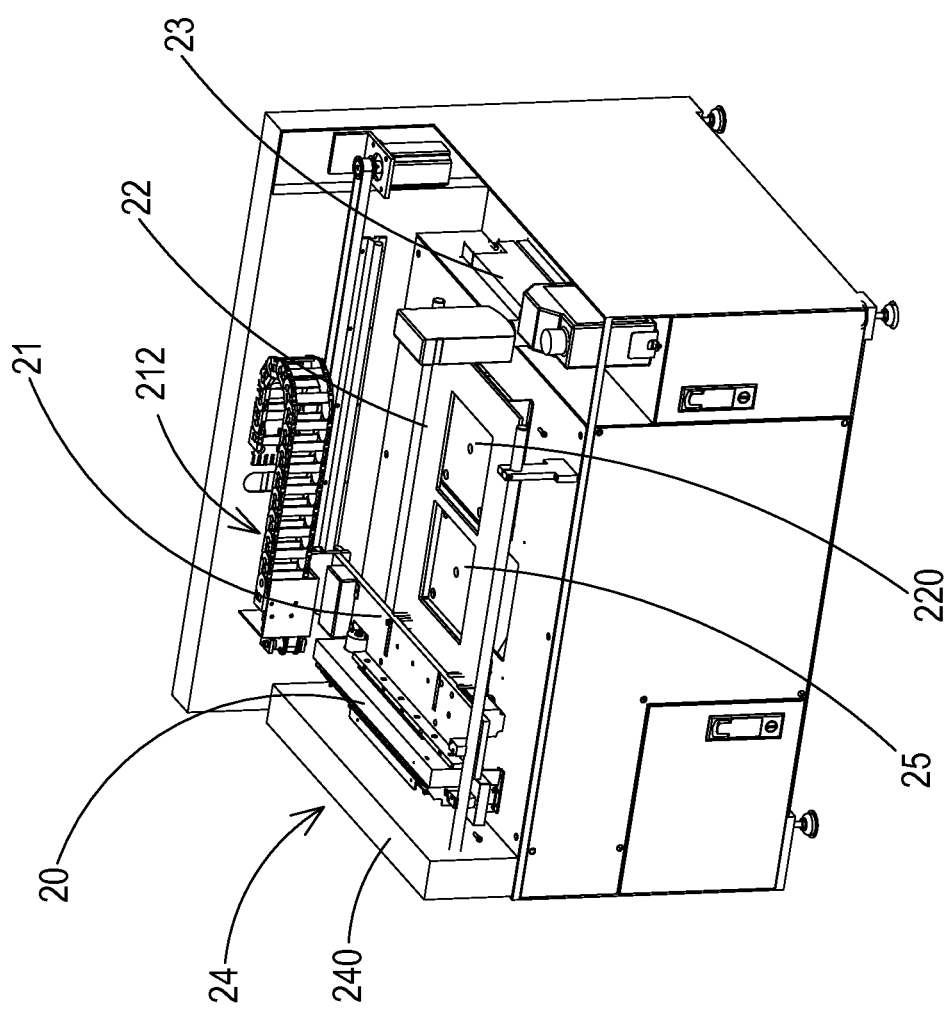
FIG. 3A is a schematic perspective view illustrating a rapid prototyping apparatus according to a first embodiment of the present invention.
Figure 3B:
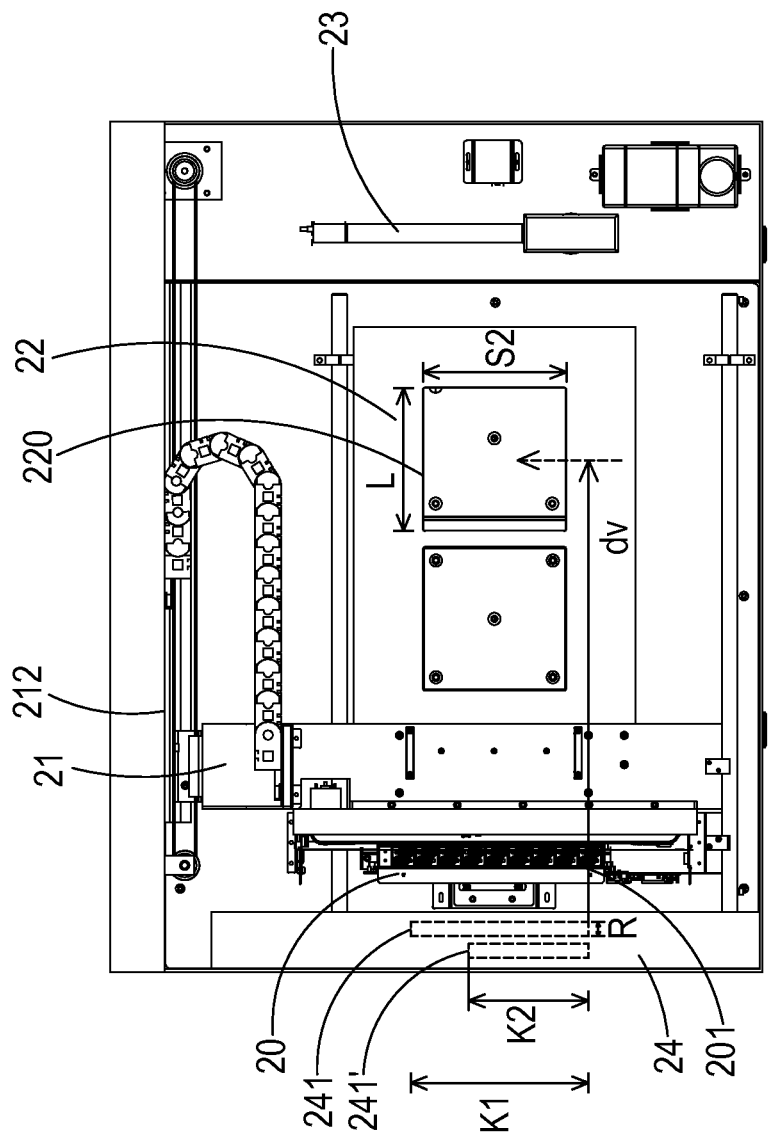
FIG. 3B is a schematic top view illustrating the rapid prototyping apparatus according to the first embodiment of the present invention.
Figure 3C:
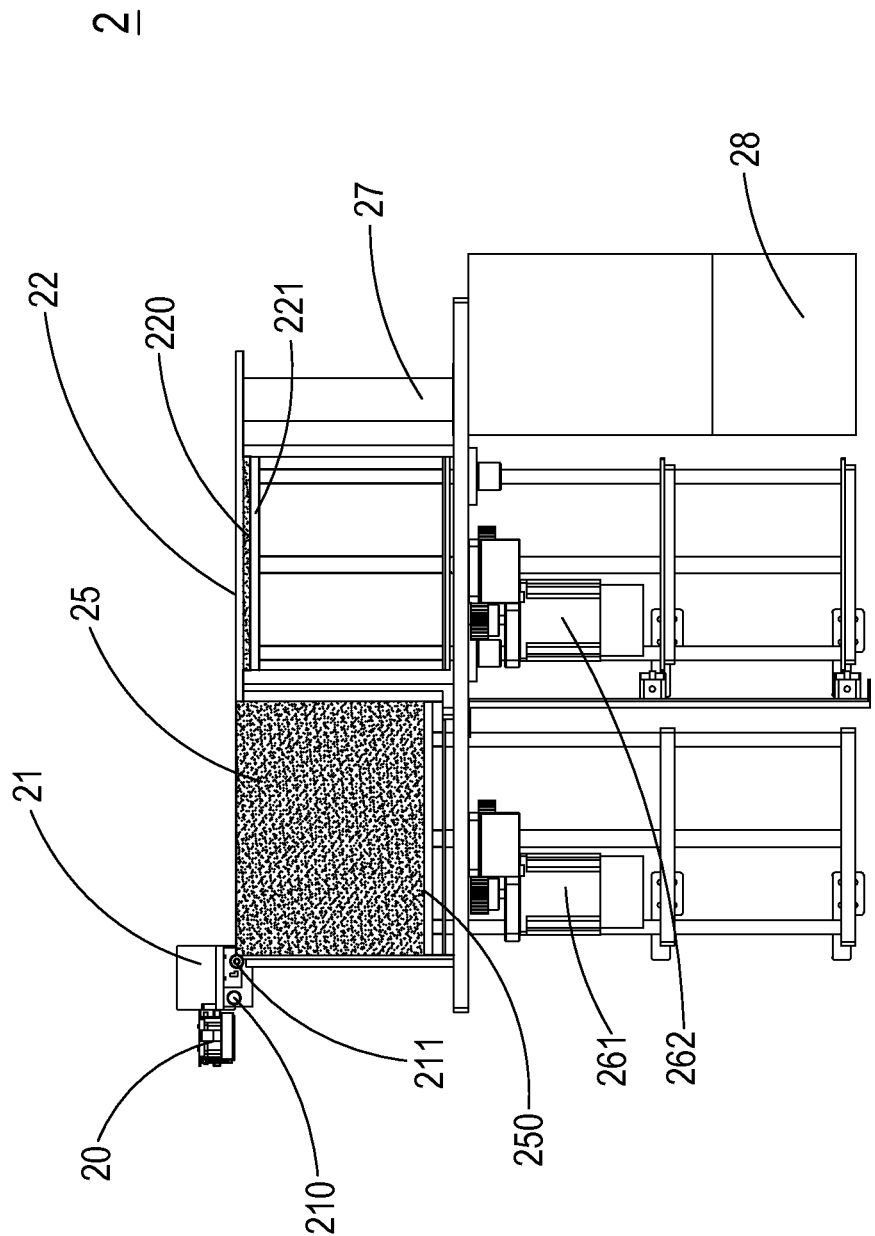
FIG. 3C is a schematic cross-sectional view illustrating the rapid prototyping apparatus according to the first embodiment of the present invention.

FIG. 3A is a schematic perspective view illustrating a rapid prototyping apparatus according to a first embodiment of the present invention. FIG. 3B is a schematic top view illustrating the rapid prototyping apparatus according to the first embodiment of the present invention. FIG. 3C is a schematic cross-sectional view illustrating the rapid prototyping apparatus according to the first embodiment of the present invention. As shown in FIGS. 3A and 3B, the rapid prototyping apparatus 2 comprises a page-width array printing module 20, a movable platform 21, a construction platform 22, a continuous liquid supply device 23, and a printing quality detecting module 24. The page-width array printing module 20 is installed on the movable platform 21. Moreover, the page-width array printing module 20 may be moved by the movable platform 21 to a position over the construction platform 22. When the movable platform 21 is driven by a moving mechanism 212, the movable platform 21 is horizontally moved relative to the construction platform 22 along the X-axis. Moreover, the construction platform 22 comprises a construction material supply container 25 and a construction chamber 220. The construction material supply container 25 is used for temporarily storing a construction material. When the movable platform 21 is moved to the construction material supply container 25, the construction material is pushed to the construction chamber 220, which is arranged beside the construction material supply container 25. Consequently, a construction layer to be printed is formed. Then, by the page-width array printing module 20, the rapid prototyping width-page printing operation is performed in the construction chamber 220. After the above steps are repeatedly done, a three-dimensional object (not shown) is produced by stacking multiple layers. The continuous liquid supply device 23 is located at a first side of the construction platform 22. Moreover, the continuous liquid supply device 23 comprises plural liquid containers (not shown) for storing print liquids. The plural liquid containers are in fluid communication with the plural inkjet head structures 201 of the page-width array printing module 20 through plural external pipes (not shown), respectively. Through the external pipes, the print liquids (e.g. liquid binders or the color inks) are continuously supplied or replenished. The printing quality detecting module 24 is located at a second side of the construction platform 22. Before or during the process of performing the rapid prototyping width-page printing operation, the printing quality detecting module 24 detects the printed pattern. If there is any failed-print part according to the printed pattern, a compensation printing operation is performed in order to compensate the print data of the failed-print part in real time. Consequently, the quality of the three-dimensional object is enhanced.

Please refer to FIG. 3C. The construction chamber 220 is formed in the construction platform 22 of the rapid prototyping apparatus 2. Moreover, the construction material supply container 25 is a fill space beside the construction chamber 220. As mentioned above, the construction material supply container 25 is used for temporarily storing the construction material (e.g. construction powder). Moreover, a first lift/lower platform 250 is disposed within the construction material supply container 25 for moving the construction material within the construction material supply container 25 along a vertical direction. In addition, a first lift/lower mechanism 261 is disposed under the construction material supply container 25 for moving the first lift/lower platform 250 along a vertical direction. Consequently, a specified amount of construction material may be guided to the topmost layer. Since the construction material supply container 25 is embedded in the construction platform 22, the construction material supply container 25 is an underfeed container. Similarly, a second lift/lower platform 221 is disposed within the construction chamber 220. A three-dimensional object produced by stacking multiple construction layers may be placed on the second lift/lower platform 221. In addition, a second lift/lower mechanism 262 is disposed under the construction chamber 220 and connected with the second lift/lower platform 221. The second lift/lower mechanism 262 is used for moving the second lift/lower platform 221 within the construction chamber 220 along the vertical direction. Consequently, a spreading space is defined in the construction chamber 220 by the second lift/lower platform 221 and the construction platform 22. Then, the desired amount of construction material is spread into the spreading space to form construction layers of the three-dimensional object. Moreover, a recycling tank 27 is located at the second side of the construction chamber 220. After the construction material is spread on the topmost layer within the construction chamber 220, the excess construction material is collected by the recycling tank 27. A sieving box 28 is located below the recycling tank 27 and in communication with the recycling tank 27. The collected construction material from the recycling tank 27 is sieved by the sieving box 28, so that the large-sized powder or dust is filtered off. Consequently, the construction material can be recycled for reuse.

Please refer to FIG. 3C again. While the rapid prototyping width-page printing operation of the rapid prototyping apparatus 2 is performed, the moving mechanism 212 (see FIG. 3A) is enabled to drive horizontal movement of the movable platform 21 relative to the construction platform 22 along the X-axis. Especially, while the horizontal movement of the movable platform 21 is driven by the moving mechanism 212, the construction material at the topmost layer of the construction material supply container 25 and moved by the first lift/lower platform 250 is horizontally pushed to the spreading space of the construction chamber 220 by a construction material pushing element 211, which is installed on the movable platform 21. Then, the page-width array printing module 20 linked with the movable platform 21 performs the rapid prototyping width-page printing operation to print the monochromatic print liquids on the construction material within the construction chamber 220. In addition, the excess construction material is further pushed to the recycling tank 27 by the construction material pushing element 211. Consequently, the excess construction material is collected by the recycling tank 27 and further recycled.

Generally, the process of constructing the three-dimensional object is very time-consuming. Consequently, the process of spreading the construction material in the construction chamber 220 should be accelerated. In the normal temperature, the monochromatic print liquid containing the liquid binder has to be solidified after the monochromatic print liquid is ejected out for a certain time period. For shortening the solidifying time, a heater 210 is additionally installed on the movable platform 21 and arranged at an opposite side of the construction material pushing element 211. While the movable platform 21 is moved relative to the construction platform 22 and the page-width array printing module 20 performs the rapid prototyping width-page printing operation to print the monochromatic print liquids on the construction material, the three-dimensional object is heated by the heater 210. Consequently, the process of stacking the construction layers is accelerated.

Figure 4:
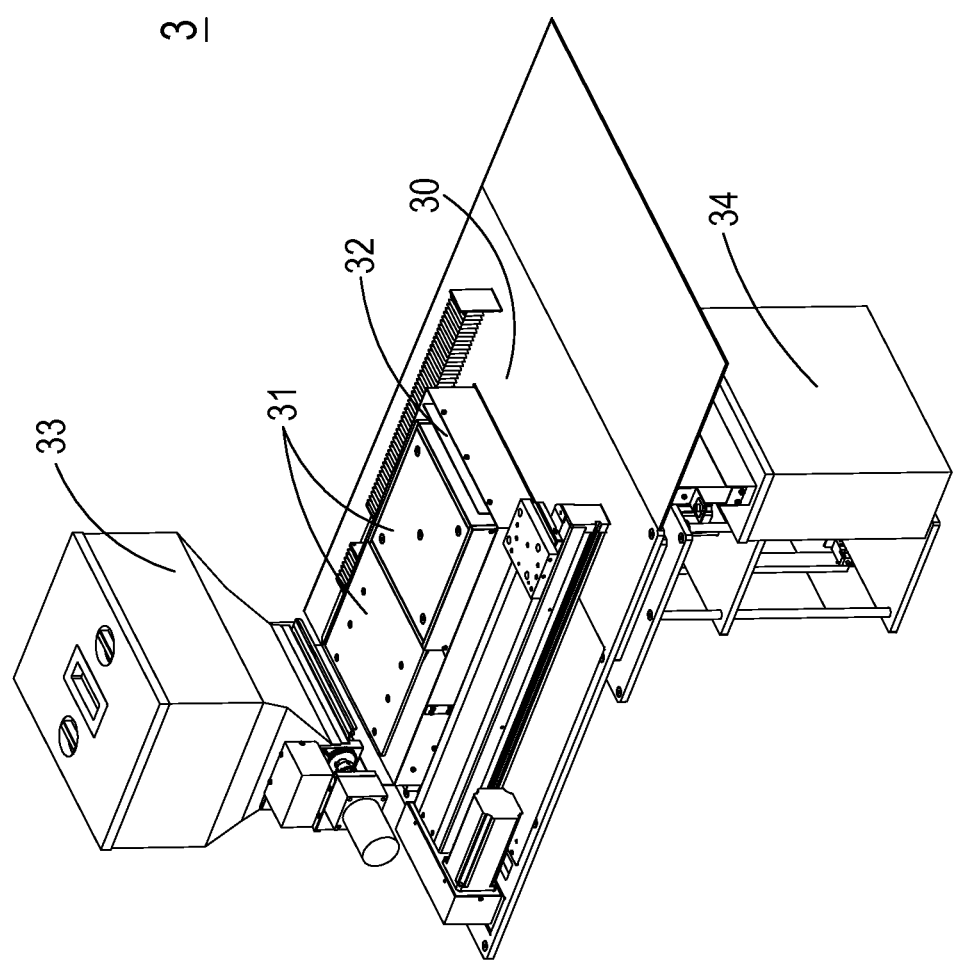
FIG. 4 is a schematic perspective view illustrating a rapid prototyping apparatus according to a second embodiment of the present invention.

FIG. 4 is a schematic perspective view illustrating a rapid prototyping apparatus according to a second embodiment of the present invention. As shown in FIG. 4, the rapid prototyping apparatus 3 comprises a page-width array printing module (not shown), a movable platform (not shown), a construction platform 30, a construction chamber 31, a recycling tank 32, a construction material supply container 33, a sieving box 34, a continuous liquid supply device (not shown), and a printing quality detecting module (not shown). Similarly, the page-width array printing module is installed on the movable platform and synchronously moved with the movable platform. Consequently, the page-width array printing module and the movable platform may be horizontally moved relative to the construction platform 30 along the X-axis. The positions and functions of the continuous liquid supply device and the printing quality detecting module are similar to those of the first embodiment, and are not redundantly described herein.

Please refer to FIG. 4 again. The construction platform 30 is equipped with the construction chamber 31, the recycling tank 32 and the construction material supply container 33. The construction platform 30 is used for spreading the construction material and providing a spreading space. Similarly, the construction chamber 31 is formed in the construction platform 30. Moreover, a lift/lower platform is disposed within the construction chamber 31, and the lift/lower platform is moved by a lift/lower mechanism (not shown) along a vertical direction. Consequently, a spreading space is defined in the construction chamber 31 by the lift/lower platform and the construction platform 30. Then, the desired amount of construction material is spread into the spreading space to form the construction layers of the three-dimensional object. After the above steps are repeatedly done, a three-dimensional object (not shown) is produced by stacking multiple layers. The recycling tank 32 is located beside the construction chamber 30. A sieving box 34 is located below the recycling tank 32 and in communication with the recycling tank 32. The structures and functions of the recycling tank 32 and the sieving box 34 are similar to those of the first embodiment. After the construction material is spread on the topmost layer within the construction chamber 31, the excess construction material is collected by the recycling tank 32. The collected construction material from the recycling tank 32 is sieved by the sieving box 34, so that the large-sized powder or dust is filtered off. Consequently, the construction material can be recycled for reuse.

As mentioned above, the structures and functions of the construction platform 30, the construction chamber 31, the recycling tank 32 and the sieving box 34 are similar to those of the first embodiment. However, the construction material supply container 33 is disposed above the construction platform 30. Under this circumstance, the construction material supply container 33 is a top-feed container. The structure of the construction material supply container 33 is shown in FIG. 4. The construction material supply container 33 has a box-shaped inner accommodation space. Moreover, an opening is formed at a bottom of the construction material supply container 33 corresponding to the construction platform 30. While the rapid prototyping width-page printing operation of the rapid prototyping apparatus 3 is performed, the construction material stored in the accommodation space falls down. That is, a desired amount of construction material is provided to the surface of the construction platform 30 through the opening. Then, the construction material is pushed to the spreading space of the construction chamber 31 by the movable platform and a construction material pushing element (not shown). Then, by the page-width array printing module, the rapid prototyping width-page printing operation is performed in the construction chamber 31 so as to print liquids on the construction material. After the above steps are repeatedly done, a three-dimensional object (not shown) is produced by stacking multiple layers.

From the above descriptions, regardless of whether the construction material supply container is an underfeed container or a top-feed container, the page-width array printing module is horizontally movable relative to the construction chamber along the X-axis to perform the rapid prototyping width-page printing operation. Consequently, the printing speed and the printing efficiency of the present invention are both enhanced.

Moreover, for increasing the speed of forming the three-dimensional object, the rapid prototyping apparatus 2, 3 may comprises two construction material supply containers 25, 33. The construction material supply containers 25, 33 are located at two opposite sides of the construction platform 22, 30. Consequently, the construction material can be spread to the construction chamber from both sides. In other words, two construction material supply containers 25, 33 are located at the two opposite sides of the construction platform 22, 30, and two sets of page-width array printing modules and movable platforms are located at the two opposite sides of the construction platform 22, 30. Consequently, the two construction material supply containers 25, 33 and the two sets of page-width array printing modules and movable platforms can spread the construction material and perform the rapid prototyping width-page printing operation from the right side and the left side. Since the construction material and the print liquids can be introduced into the construction chamber from the both sides, the printing speed is largely increased (e.g. 5 PPM or over). Consequently, the printing speed and the printing efficiency of the present invention are both enhanced. In other words, the construction material may be provided in an underfeed manner or a top-feed manner, and the construction material may be spread from a single side or both sides. That is, numerous modifications and alterations may be made while retaining the teachings of the invention.

Figure 5A:
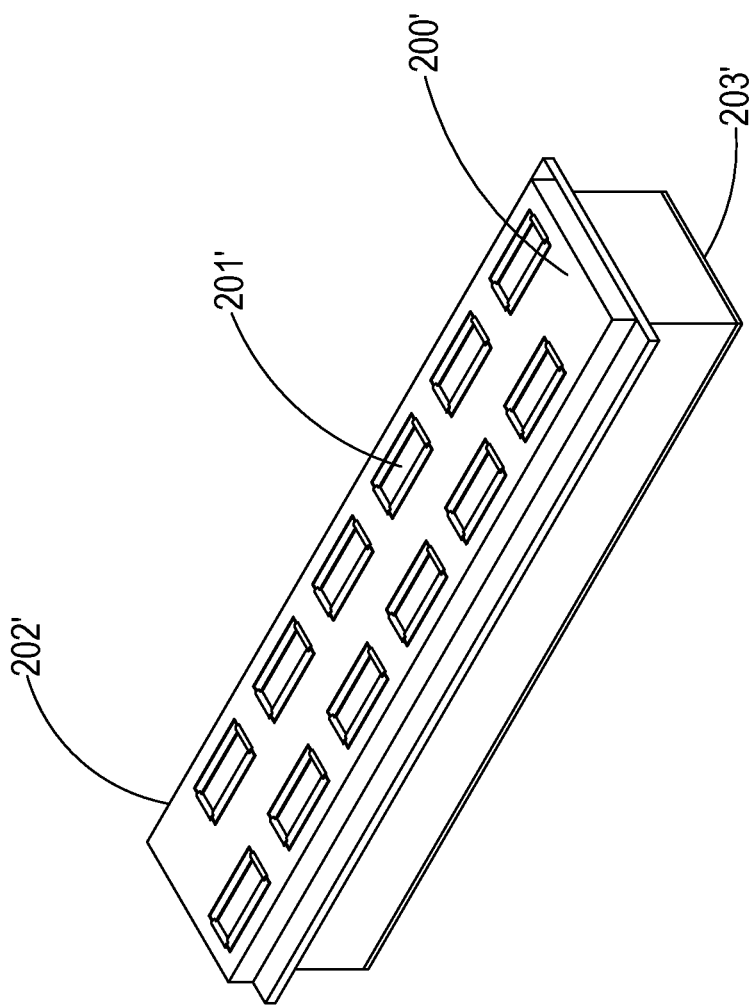
FIG. 5A is a schematic perspective view illustrating the outward appearance of a page-width array printing module of the rapid prototyping apparatus of FIG. 3A according to an embodiment of the present invention.
Figure 5B:
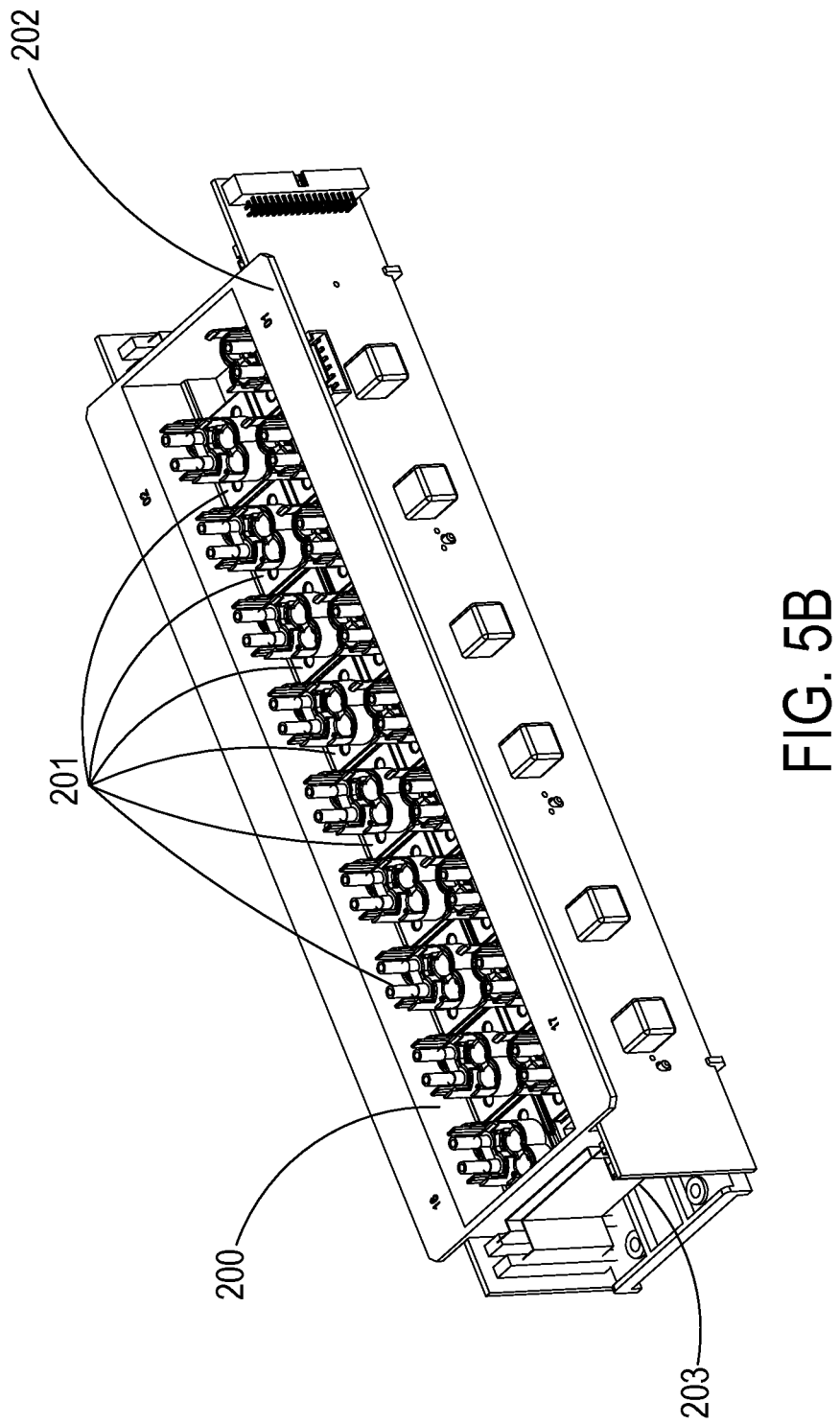
FIG. 5B is a schematic perspective view illustrating a page-width array printing module of the rapid prototyping apparatus of FIG. 3A according to another embodiment of the present invention.

Please refer to FIGS. 2A, 3A, 5A and 5B. FIG. 5A is a schematic perspective view illustrating the outward appearance of a page-width array printing module of the rapid prototyping apparatus of FIG. 3A according to an embodiment of the present invention. FIG. 5B is a schematic perspective view illustrating a page-width array printing module of the rapid prototyping apparatus of FIG. 3A according to another embodiment of the present invention. As shown in FIG. 5A, the page-width array printing module 20 of the rapid prototyping apparatus 2 comprises a page-width array printing unit 200', and a printing platform 202' (also called page-width printing platform). The page-width array printing unit 200' is installed on the printing platform 202' and comprises plural inkjet head structures 201'. The plural inkjet head structures 201' are discretely arranged at an equal distance. In this embodiment, the printing platform 202' is an integral package structure, and thus the plural inkjet head structures 201' are irreplaceable. That is, if the page-width array printing unit 200' is subject to damage, it is necessary to replace the printing platform 202' with a new one.

As shown in FIG. 5B, the page-width array printing module 20 of the rapid prototyping apparatus 2 comprises a page-width array printing unit 200, and a printing platform 202 (also called page-width printing platform). The page-width array printing unit 200 is installed on the printing platform 202 and comprises plural inkjet head structures 201. The plural inkjet head structures 201 are discretely arranged at an equal distance. In this embodiment, the plural inkjet head structures 201 are replaceable. That is, the plural inkjet head structures 201 installed on the printing platform 202 are independent inkjet cartridges. That is, these inkjet head structures 201 can be replaced independently. If a specified inkjet head structure 201 is subject to damage, it is only necessary to replace the specified inkjet head structure 201 without the need of replacing the whole printing platform 202 with a new one.

Figure 5C:
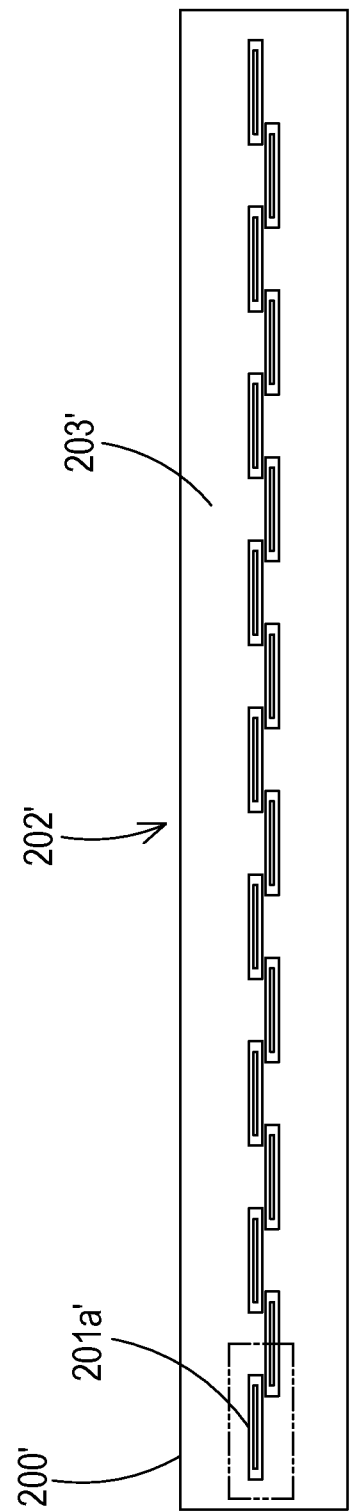
FIG. 5C is a schematic bottom view illustrating the page-width array printing module of FIG. 5A.
Figure 5D:
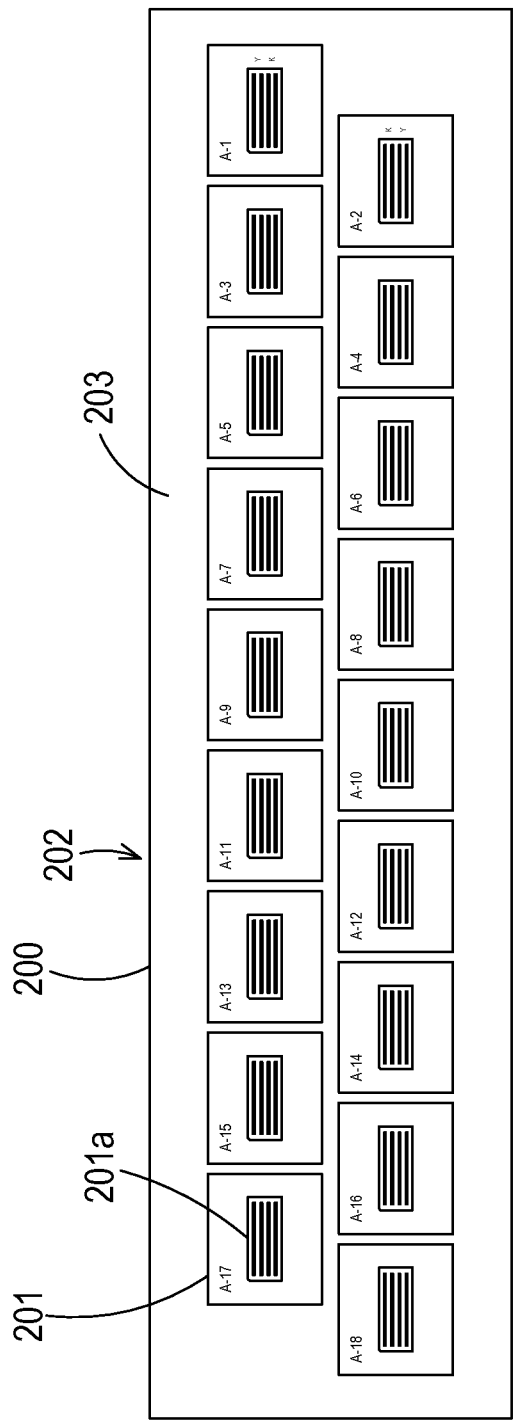
FIG. 5D is a schematic bottom view illustrating the page-width array printing module of FIG. 5B.

FIG. 5C is a schematic bottom view illustrating the page-width array printing module of FIG. 5A. FIG. 5D is a schematic bottom view illustrating the page-width array printing module of FIG. 5B. As mentioned above, the plural inkjet head structures 201' on the printing platform 202' are irreplaceable, and the plural inkjet head structures 201 on the printing platform 202 are replaceable. Moreover, each inkjet head structure 201' comprises an inkjet chip 201*a'*, and each inkjet head structure 201 comprises an inkjet chip 201*a*. The inkjet chips 201*a'* are formed on a bottom surface 203' of the printing platform 202', and the inkjet chips 201*a* are formed on a bottom surface 203 of the printing platform 202. In FIG. 5C, the arrangements of the plural inkjet head structures 201' are shown. In FIG. 5D, the arrangements of the plural inkjet head structures 201 are shown. It is found that the inkjet head structures 201 comprise respective inkjet chips 201*a*. Moreover, as shown in FIGS. 5C and 5D, the inkjet chips 201*a'* of the inkjet head structures 201' are installed on the printing platform 202', and the inkjet chips 201*a* of the inkjet head structures 201 are installed on the printing platform 202. Moreover, the plural inkjet chips are arranged in plural rows and in a staggered form. Consequently, the overall printing width W of the plural inkjet head structures is larger than or equal to the width S1 of the printed pattern (see FIG. 2A).

Figure 5E:
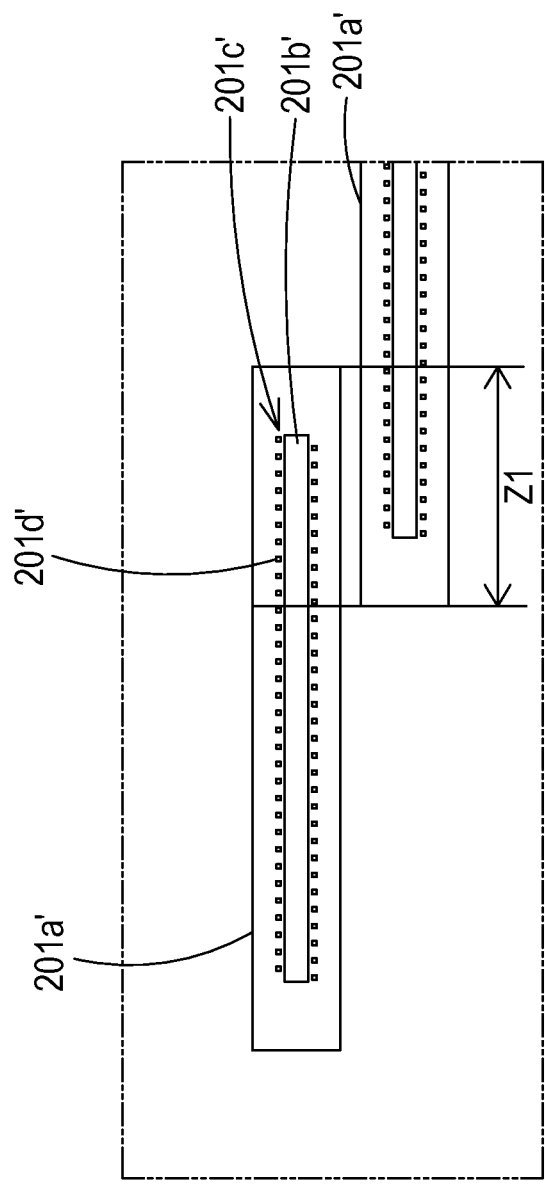
FIG. 5E is a schematic enlarged fragmentary bottom view illustrating the page-width array printing module of FIG. 5C.
Figure 5F:
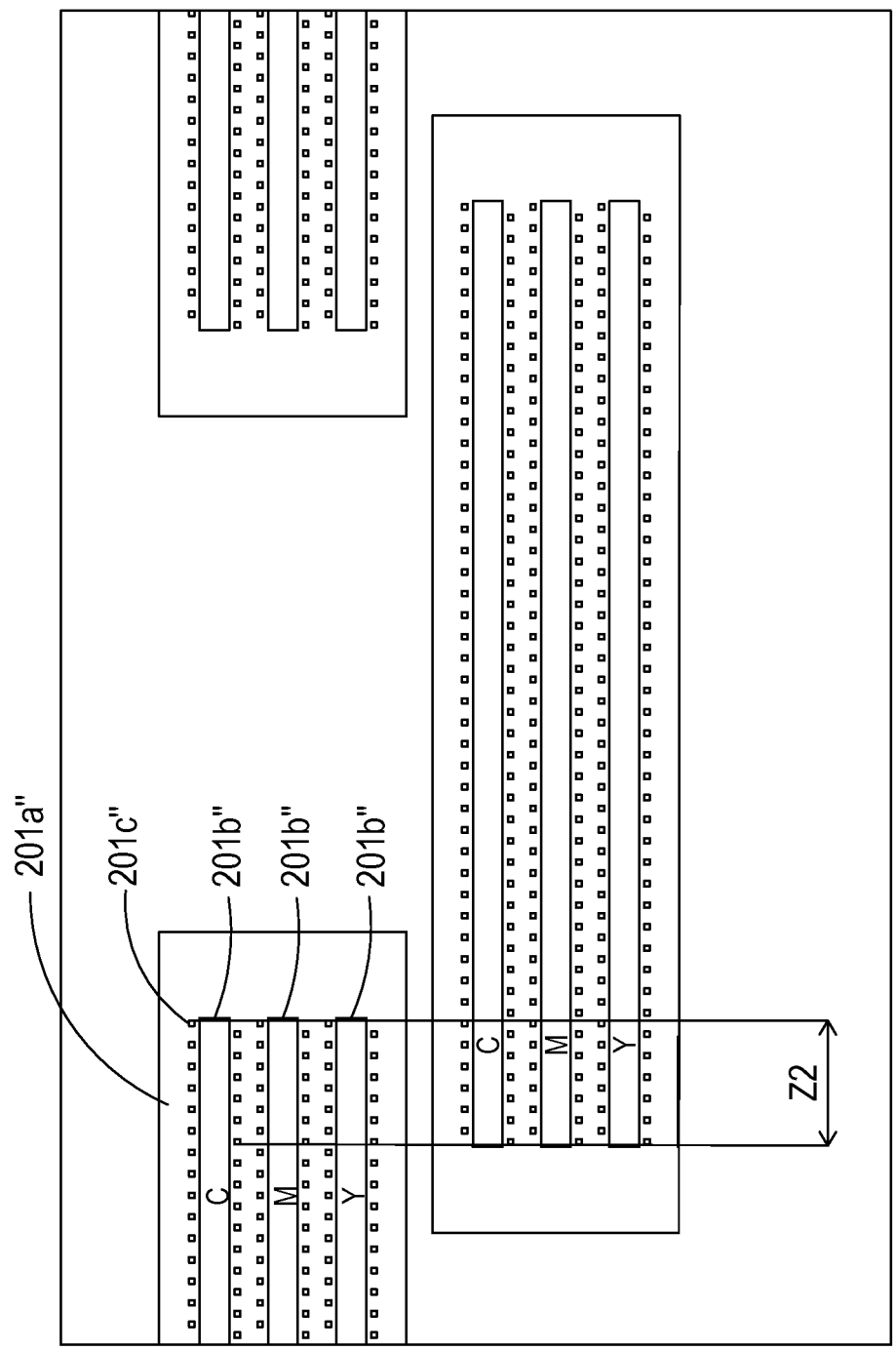
FIG. 5F is a schematic enlarged fragmentary bottom view illustrating the page-width array printing module of another embodiment.
Figure 5G:
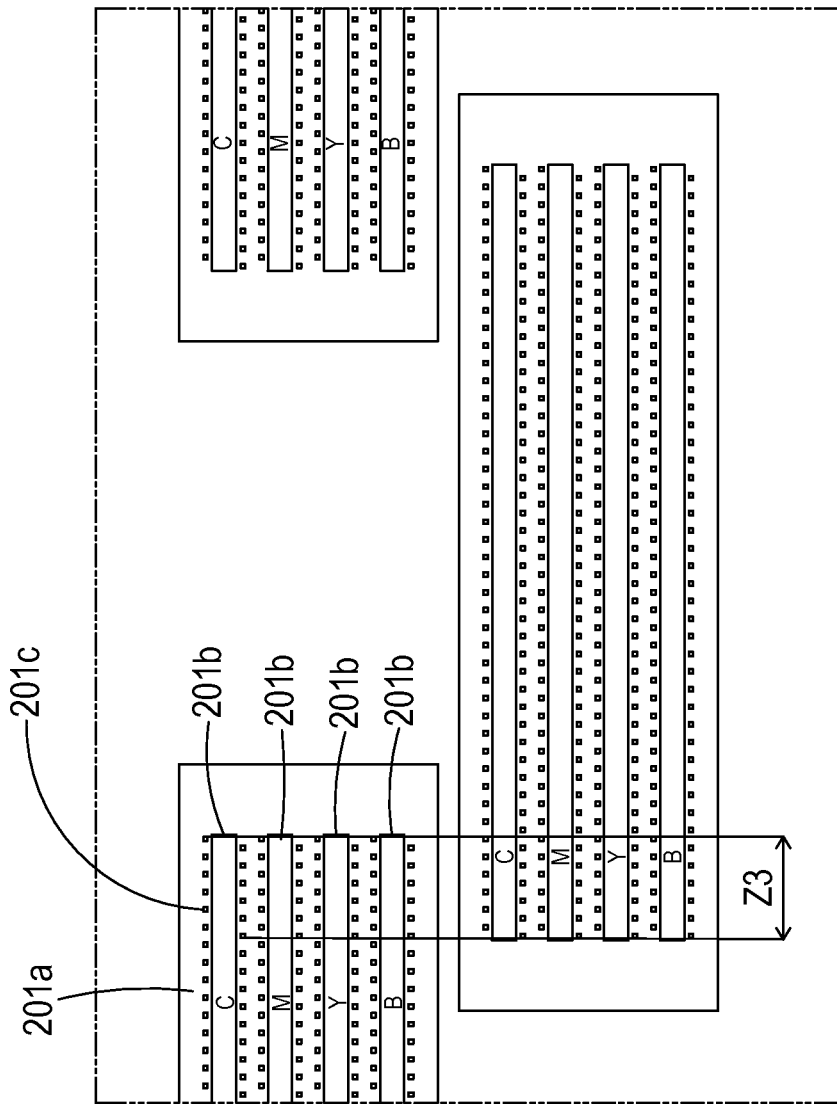
FIG. 5G is a schematic enlarged fragmentary bottom view illustrating the page-width array printing module of FIG. 5D.

Please refer to FIGS. 5C~5G FIG. 5E is a schematic enlarged fragmentary bottom view illustrating the page-width array printing module of FIG. 5C. FIG. 5F is a schematic enlarged fragmentary bottom view illustrating the page-width array printing module of another embodiment. FIG. 5G is a schematic enlarged fragmentary bottom view illustrating the page-width array printing module of FIG. 5D. As shown in FIG. 5E, each of the inkjet chips 201*a'* comprises a liquid supply slot 201*b'*. Moreover, plural liquid ejectors 201*c'* are located at bilateral sides of the liquid supply slot 201*b'* along the long axis of the liquid supply slot 201*b'*. Each of the liquid ejectors 201*c'* comprises a heating resistor (not shown) and a corresponding nozzle 201*d'*. The heating resistor is disposed within a cavity (not shown), which is in fluid communication with the liquid supply slot 201*b'*. Moreover, the cavity is sealed by a nozzle plate (not shown). The nozzles 201*d'* are formed in the nozzle plate and corresponding to the respective heating resistors. When the print liquid is heated by the corresponding heating resistor, the print liquid is vaporized and the drop of the print liquid is ejected through the corresponding nozzle 201*d'*. Consequently, the printing action of the corresponding liquid ejector 201*c'* is implemented. In some embodiments, the print liquid is a liquid binder or a color ink. An example of the color liquid includes but is not limited to a pigment-based ink or a dye-based ink.

In the embodiment of FIG. 5E, the inkjet chip 201*a'* comprises a single liquid supply slot 201*b'*. In the embodiment of FIG. 5F, the inkjet chip 201*a"* comprises three liquid supply slots 201*b"*. Moreover, plural liquid ejectors 201*c"* are located at bilateral sides of the liquid supply slot 201*b"* along the long axis of the liquid supply slot 201*b"*. In the embodiment of FIG. 5G, the inkjet chip 201*a* comprises four liquid supply slots 201*b*. Moreover, plural liquid ejectors 201*c* are located at bilateral sides of the liquid supply slot 201*b* along the long axis of the liquid supply slot 201*b*.

Please refer to FIGS. 5E, 5F and 5G again. The plural inkjet chips 201*a'*, 201*a"* and 201*a* in different rows are in parallel with each other. There is an overlap region Z1 between two adjacent inkjet chips 201*a'* in different rows; there is an overlap region Z2 between two adjacent inkjet chips 201*a"* in different rows; and there is an overlap region Z3 between two adjacent inkjet chips 201a in different rows. The inkjet chips of two adjacent rows in the overlap region Z1, Z2 or Z3 are aligned with each other. Consequently, the liquid ejectors 201c', 201c" and 201c are continuously distributed in order to perform the width-page printing operation. While the width-page printing operation is performed, the liquid ejectors are enabled to eject drops of the print liquids. Preferably, the drop of the print liquid has a specified diameter such that the drop of the print liquid covers at least two thirds of the particle surface area of the construction material. Due to the specified diameter of the drop of the print liquid, the drop of the print liquid can cover the majority of the particle of the construction material during the process of performing the rapid prototyping width-page printing operation. Consequently, the color saturation is enhanced, and it is not necessary to print multiple points in a single pixel. Moreover, due to the specified diameter of the drop of the print liquid, the possibility of permeating the print liquids into the underlying construction layers will be minimized. Under this circumstance, the printing quality is enhanced while maintain the binding force between the print liquids and the underlying construction layers.

Please refer to FIGS. 5E, 5F and 5G again. The three types of inkjet chips 201a', 201a" and 201a may be used to perform monochromatic printing operations or polychromatic printing operations. As shown in FIG. 5E, the inkjet chip 201a' comprises the single liquid supply slot 201b'. Consequently, a monochromatic print liquid may be introduced into the single liquid supply slot 201b' in order to perform the monochromatic printing operation. As shown in FIGS. 5F and 5G, the inkjet chip 201a" comprises three liquid supply slots 201b', and the inkjet chip 201a comprises four liquid supply slots 201b. If the same monochromatic print liquid is introduced into the three liquid supply slots 201b' and the four liquid supply slots 201b, the multi-slot monochromatic printing operations are performed. In some embodiments, the monochromatic print liquid is colorless or monochromatic. An example of the monochromatic print liquid includes but is not limited to a transparent binder liquid, a cyan (C) print liquid, a yellow (Y) print liquid, a magenta (M) print liquid, a light cyan print liquid, a magenta print liquid or a grayscale print liquid.

As shown in FIG. 5F, different monochromatic print liquids are introduced into the three liquid supply slots 201b" of the inkjet chip 201a", respectively. For example, a cyan (C) print liquid is introduced into the first liquid supply slot, a yellow (Y) print liquid is introduced into the second liquid supply slot, and a magenta (M) print liquid is introduced into the third liquid supply slot. Consequently, a CMY polychromatic printing operation is performed.

As shown in FIG. 5G, different monochromatic print liquids are introduced into the four liquid supply slots 201b of the inkjet chip 201a, respectively. For example, a cyan (C) print liquid is introduced into the first liquid supply slot, a yellow (Y) print liquid is introduced into the second liquid supply slot, a magenta (M) print liquid is introduced into the third liquid supply slot, and a transparent binder liquid is introduced into the fourth liquid supply slot. Consequently, a polychromatic printing operation is performed. In other words, as shown in FIGS. 5F and 5G, the different monochromatic print liquids are introduced into the liquid supply slots in order to perform the polychromatic printing operation.

In case that the plural inkjet head structures 201 are replaceable (see FIG. 5B), the monochromatic printing operation or the polychromatic printing operation may be determined according to the practical requirements. For example, the plural inkjet head structures 201 installed on the printing platform 202 may comprise plural inkjet chips 201a' with single liquid supply slots 201b' (see FIG. 5E) in order to perform the monochromatic printing operation. Alternatively, the plural inkjet head structures 201 may comprise plural inkjet chips 201a" or 201a with plural liquid supply slots 201b" or 201b (see FIG. 5F or FIG. 5G) and the same monochromatic print liquid is introduced into the liquid supply slots in order to perform the multi-slot monochromatic printing operation. Alternatively, the plural inkjet head structures 201 may comprise plural inkjet chips 201a" or 201a with plural liquid supply slots 201b" or 201b (see FIG. 5F or FIG. 5G) and different monochromatic print liquid are introduced into the liquid supply slots in order to perform the polychromatic printing operation. Moreover, the monochromatic print liquids stored in the inkjet head structures may be in fluid communication with the continuous liquid supply device 23 of FIG. 3A through an external pipe (not shown), so that a continuous liquid supply system is defined.

Figure 6A:
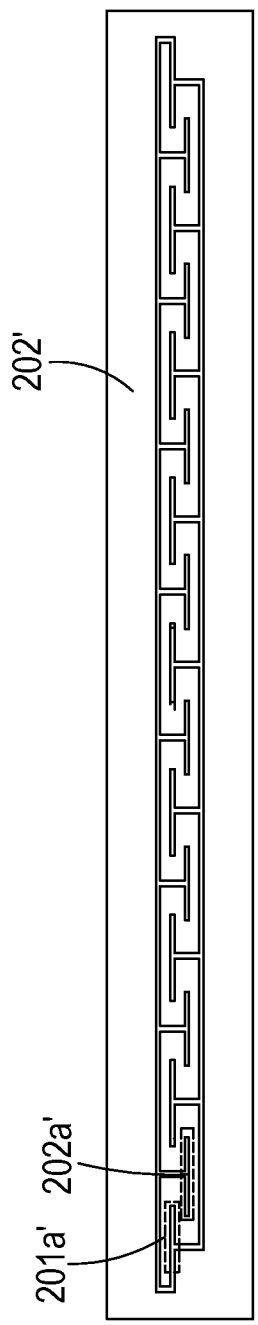
FIG. 6A schematically illustrates plural liquid supply channels of the printing platform of the page-width array printing module of FIG. 5E.

In case that the plural inkjet head structures 201' are irreplaceable (see FIG. 5A), the monochromatic printing operation may be performed. FIG. 6A schematically illustrates plural liquid supply channels of the printing platform of the page-width array printing module of FIG. 5E. For performing the monochromatic printing operation, the printing platform 202' has the inner structure as shown in FIG. 6A. The monochromatic print liquid may be stored in the printing platform 202'. The printing platform 202' comprises at least one liquid supply channel 202a', which is in fluid communication with the stored monochromatic print liquid. Similarly, the stored monochromatic print liquid may be in fluid communication with the continuous liquid supply device 23 of FIG. 3A through an external pipe (not shown), so that a continuous liquid supply system is defined. For performing the monochromatic printing operation, as shown in FIG. 6A, the printing platform 202' comprises plural liquid supply channels 202a' corresponding to respective inkjet chips 201a'. These liquid supply channels 202a' are in fluid communication with each other. The inkjet chips 201a' comprise respective single liquid supply slots 201b'. The single liquid supply slots 201b' are in fluid communication with the corresponding liquid supply channels 202a' of the printing platform 202'. When the monochromatic print liquid is transmitted through the liquid supply channels 202a', the monochromatic printing operation may be performed.

Figure 6B:
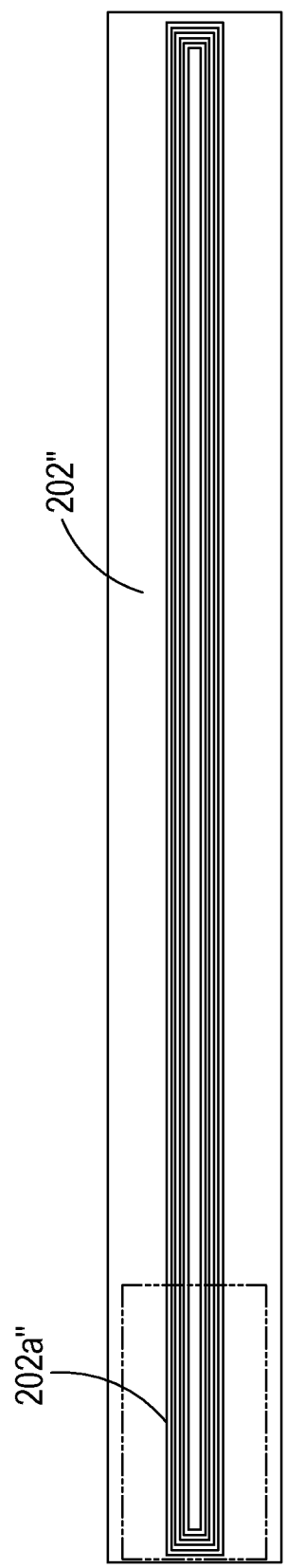
FIG. 6B schematically illustrates plural liquid supply channels of the printing platform of the page-width array printing module of FIG. 5F.

Moreover, in case that the plural inkjet head structures 201' are irreplaceable (see FIG. 5A), the multi-slot monochromatic printing operation or the polychromatic printing operation may be performed. FIG. 6B schematically illustrates plural liquid supply channels of the printing platform of the page-width array printing module of FIG. 5F. FIG. 6C is a schematic enlarged fragmentary bottom view illustrating the page-width array printing module of FIG. 6B. As shown in FIGS. 6B and 6C, the printing platform 202" (also called page-width printing platform) comprises three ring-shaped liquid supply channels 202a". These liquid supply channels 202a" are not in fluid communication with each other. Each of the liquid supply channels 202a" is correlated with plural rows of inkjet chips 201a", which are arranged in a staggered form. If the same monochromatic print liquid is transmitted through the three liquid supply channels 202a", the multi-slot monochromatic printing operation may be performed. It is noted that the number of liquid supply channels 202a" for performing the multi-slot monochromatic printing operation is not restricted. That is, the number of liquid supply channels 202a" may be determined according to the practical requirements. Moreover, if different monochromatic print liquids are transmitted through the respective liquid supply channels 202a", the polychromatic printing operation may be performed.

From the above descriptions, regardless of whether the plural inkjet head structures are replaceable or irreplaceable, the inkjet chips of the inkjet head structures are diversified. The plural inkjet chips are arranged in plural rows and in a staggered form. The overall printing width W of the plural inkjet head structures is larger than or equal to the width S1 of the printed pattern. Consequently, the rapid prototyping width-page printing operation can be performed by the rapid prototyping apparatus 2.

Figure 7A:
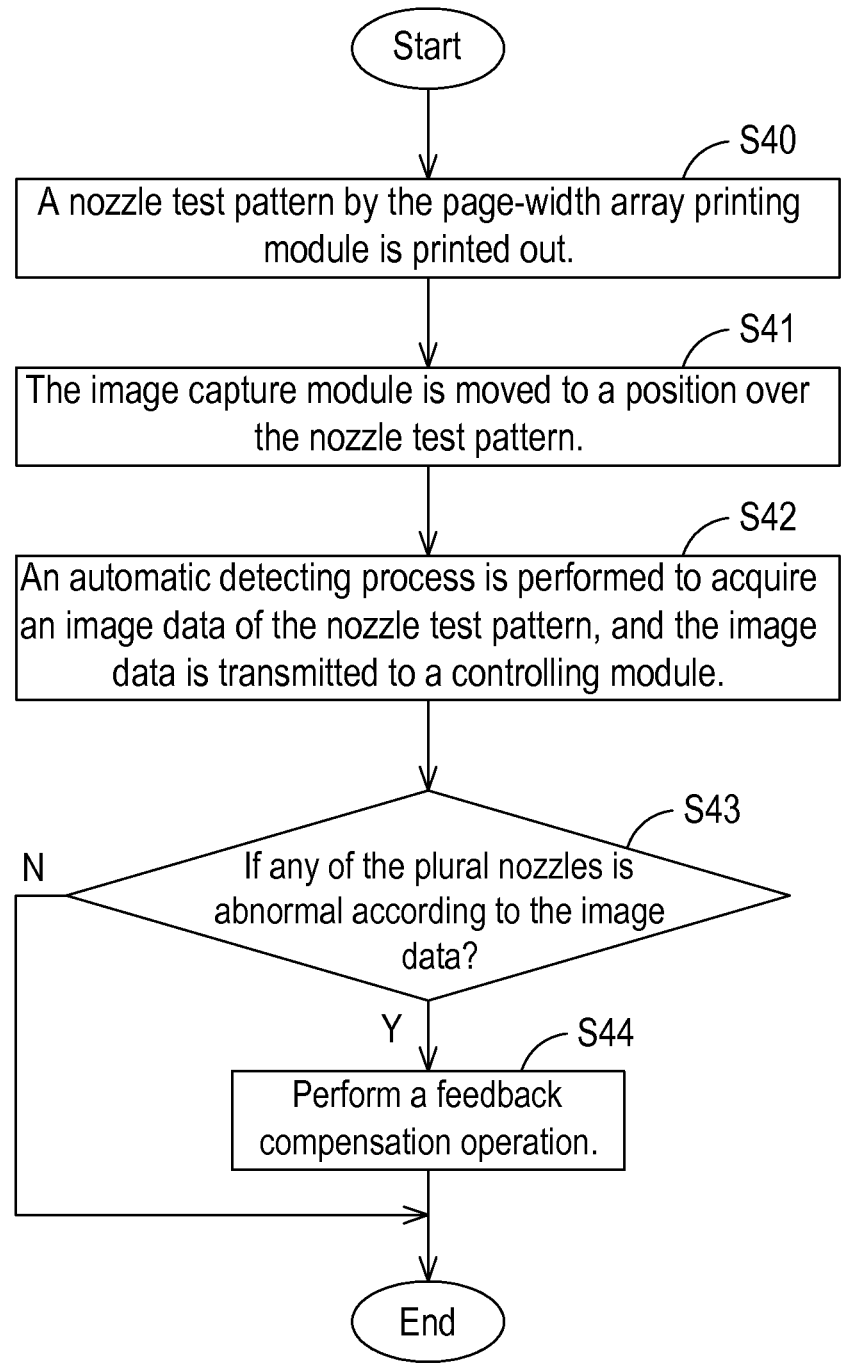
FIG. 7A is a flowchart illustrating a printing quality detecting method of the rapid prototyping apparatus of FIG. 3A.

Please refer to FIGS. 3A, 3B and 7A. FIG. 7A is a flowchart illustrating a printing quality detecting method of the rapid prototyping apparatus of FIG. 3A. The printing quality detecting method is implemented by the printing quality detecting module 24, which is located at the second side of the construction platform 22. The printing quality detecting module 24 can automatically detect images in order to monitor the printing quality. In this embodiment as shown in FIG. 3A, the printing quality detecting module 24 comprises an image capture module 241 (see FIG. 3B), a dustproof cover 240 and a driving mechanism (not shown). The image capture module 241 is disposed within the dustproof cover 240 and connected with the driving mechanism. While the rapid prototyping width-page printing operation is performed, the image capture module 241 is covered by the dustproof cover 240. Consequently, the lens module of the image capture module 241 is not contaminated by the surrounding dust. For performing the printing quality detecting method, the dustproof cover 240 is firstly removed, and then the image capture module 241 is moved to a position over the construction chamber 220 by the driving mechanism. Consequently, the subsequent image capturing and detecting processes are performed. The detailed procedures of the printing quality detecting method will be illustrated with reference to FIG. 7A.

Firstly, the page-width array printing module 20 is moved to a position over the construction chamber 220, and a nozzle test pattern is printed on the topmost layer of the construction chamber 220 by the page-width array printing module 20 (Step S40). Then, in the step S41, the image capture module 241 is horizontally moved to a position over the nozzle test pattern, which is within the construction chamber 220. Then, in the step S42, an automatic detecting process is performed to acquire an image data of the nozzle test pattern by the image capture module 241, and the image data is transmitted to a controlling module (not shown). Then, in the step S43, the controlling module judges whether any of the nozzles of the page-width array printing module 20 is abnormal according to the image data. If the judging condition of the step S43 is satisfied, it means that one or more of the plural nozzles are clogged, damaged or contaminated. Consequently, the number of the at least one failed-print part and the information about the at least one failed-print part are acquired. Then, the step S44 is performed. In the step S44, a feedback compensation operation is performed according to the information about the failed-print part. If the judging condition of the step S43 is not satisfied, it means that the plural nozzles are normal, and thus the automatic detecting process is ended. For example, the feedback compensation operation is a cleaning operation or a compensation printing operation, but is not limited thereto.

Moreover, while the image capture module 241 is moved to the position over the nozzle test pattern (Step S41) and the automatic detecting process is performed (Step S42), the detecting range of the image capture module 241 should cover the whole print area. For example, as shown in FIG. 3B, the image capture module 241 has a length K1 and a width R, and the print area (i.e. the construction chamber 220) has a length S2 and a width L. If the length K1 of the image capture module 241 is larger than or equal to the length S2 of the print area and the width R of the image capture module 241 is larger than or equal to the width L of the print area, when the image capture module 241 is located over the print area, the detecting range of the image capture module 241 covers the whole print area. Under this circumstance, the image of the nozzle test pattern in the print area can be detected and captured by the image capture module 241 without the need of moving the image capture module 241. Whereas, if the length K1 of the image capture module 241 is larger than or equal to the length S2 of the print area and the image capture module 241 is not located over the print area, the image capture module 241 has to be moved for a horizontal distance dv along the X-axis. After the image capture module 241 is moved to the position over the print area, the image capture module 241 can detect and capture the image of the nozzle test pattern in the print area. Whereas, if the length K2 of the image capture module 241' is smaller than the length S2 of the print area, the nozzle test pattern in the print area fails to be detected by the image capture module 241'. Under this circumstance, the image capture module 241 has to be moved for a horizontal distance dv along the X-axis and then moved along the Y-axis. After the image capture module 241 is moved to the position over the print area, the image capture module 241 can detect and capture the image of the nozzle test pattern in the print area.

Figure 7B:
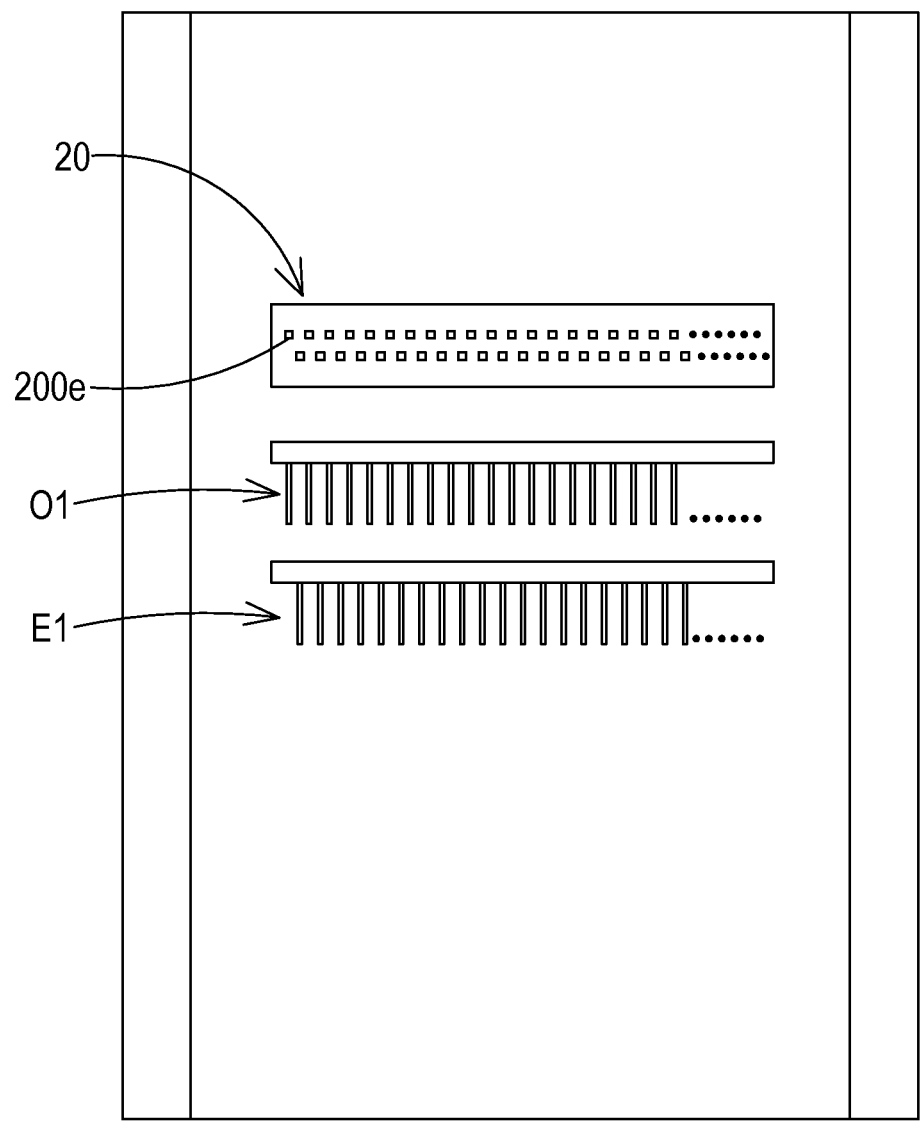
FIG. 7B schematically illustrates a result of performing an automatic detecting process by the printing quality detecting module of the rapid prototyping apparatus of FIG. 3A.
Figure 7C:
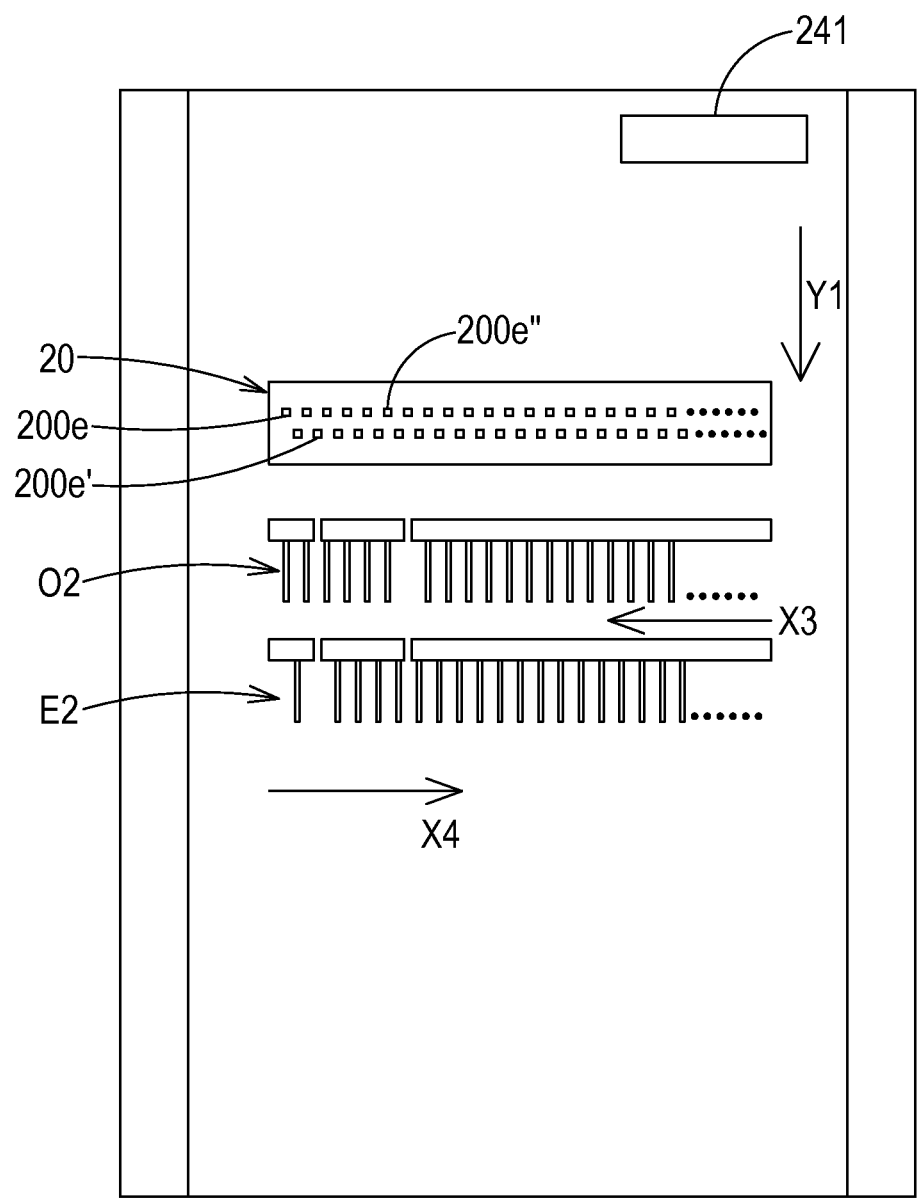
FIG. 7C schematically illustrates a result of performing an automatic detecting process by the scanning module of the printing quality detecting module of FIG. 3A, in which the nozzle test pattern has failed-print parts.

However, after the page-width array printing module 20 has been used for a certain time period, some of the nozzles of the inkjet head structures of the page-width array printing module 20 are possibly clogged or damaged. Under this circumstance, the printed lines are discontinuous. FIG. 7B schematically illustrates a result of performing an automatic detecting process by the printing quality detecting module of FIG. 3A. As shown in FIG. 7B, the print result O1 corresponding to the odd-row nozzles and the print result E1 corresponding to the even-row nozzles are successfully and continuously printed out because all nozzles 200e of the page-width array printing module 20 are normal. As shown in FIG. 7C, the print result O2 corresponding to the odd-row nozzles and the print result E2 corresponding to the even-row nozzles are not successfully and continuously printed out because some nozzles are clogged or damaged. For example, the print result O2 of the nozzle test pattern has a failed-print part corresponding to the sixth nozzle 200e" of an odd row; and the print result E2 of the nozzle test pattern has a failed-print part corresponding to the second nozzle 200e' of an even row. In other words, the sixth nozzle 200e" of the odd row and the second nozzle 200e' of the even row are abnormal.

Moreover, a digital data corresponding to the nozzle test pattern is acquired by the image capture module 241. An example of the image capture module 241 includes but is not limited to a scanning module or an optical detecting module. As shown in FIG. 7C, the image capture module 241 is an optical detecting module. The optical detecting module may detect the print data of the nozzle test pattern corresponding to the plural nozzles 200e and judge whether the intensities of the reflected light beams are normal or not. If any failed-print part is detected, the information about the failed-print part is acquired. In this embodiment, the optical detecting module is firstly moved along the direction Y1. When the lines of the nozzle test pattern are detected, the optical detecting module is moved from right to left along the direction X3 to detect the intensities of the reflected light beams from the print result O2 corresponding to odd-row nozzles, and then the optical detecting module is moved from left to right along the direction X4 to detect the intensities of the reflected light beams from the print result E2 corresponding to even-row nozzles. According to the intensities of the reflected light beams, the controlling module judges whether any of the nozzles 200e of the page-width array printing module 20 is abnormal and acquire the digital data corresponding to the abnormal print data of the nozzle test pattern. According to the digital data, the number of the at least one failed-print part and the information about the at least one failed-print part are acquired.

Figure 7D:
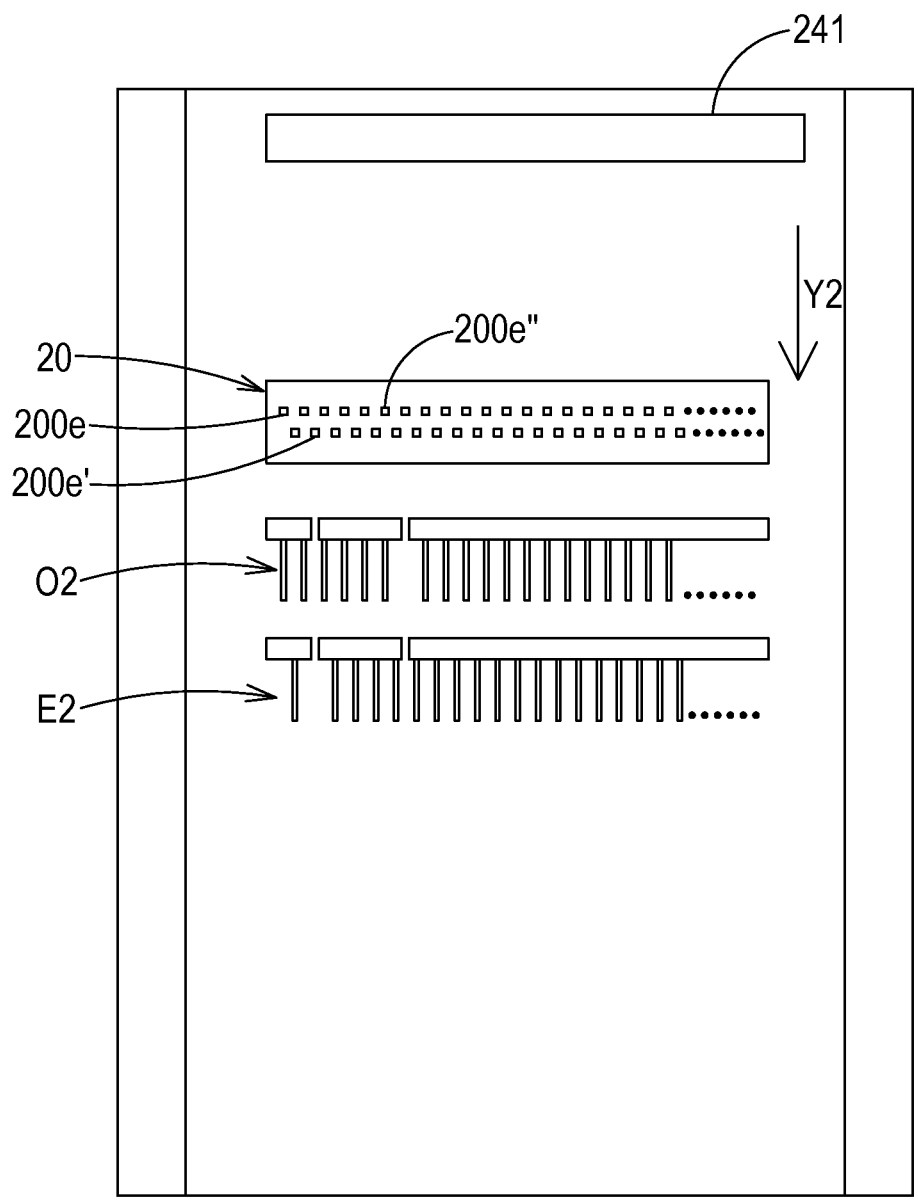
FIG. 7D schematically illustrates a result of performing an automatic detecting process by the an optical detecting module of the printing quality detecting module of FIG. 3A, in which the nozzle test pattern has failed-print parts.

As shown in FIG. 7D, the image capture module 241 is a scanning module. The scanning module may be moved relative to the nozzle test pattern along the direction Y2 in order to scan the nozzle test pattern. After the nozzle test pattern is scanned by the scanning module, a digital data corresponding to the nozzle test pattern is acquired. According to the digital data, the controlling module judges whether any of the nozzles 200e of the page-width array printing module 20 is abnormal and acquire the digital data corresponding to the abnormal print data of the nozzle test pattern. According to the digital data, the number of the at least one failed-print part and the information about the at least one failed-print part are acquired.

If some abnormal nozzles are detected after the automatic detecting process is performed by the image capture module 241, it means that the quality of the three-dimensional object printed by the page-width array printing module 20 is deteriorated. Consequently, by a feedback compensation mechanism, the compensation printing operation is performed. In other words, the printing quality detecting method of the present invention is capable of quickly and accurately judging the failed-print part, thereby performing the compensation printing operation. Under this circumstance, the quality of the three-dimensional object is enhanced.

Consequently, for implementing the compensation printing operation, the page-width array printing module 20 may be further modified. For example, the page-width array printing module 20 may comprise at least two parallel page-width array printing units with the same configurations.

Figure 8A:
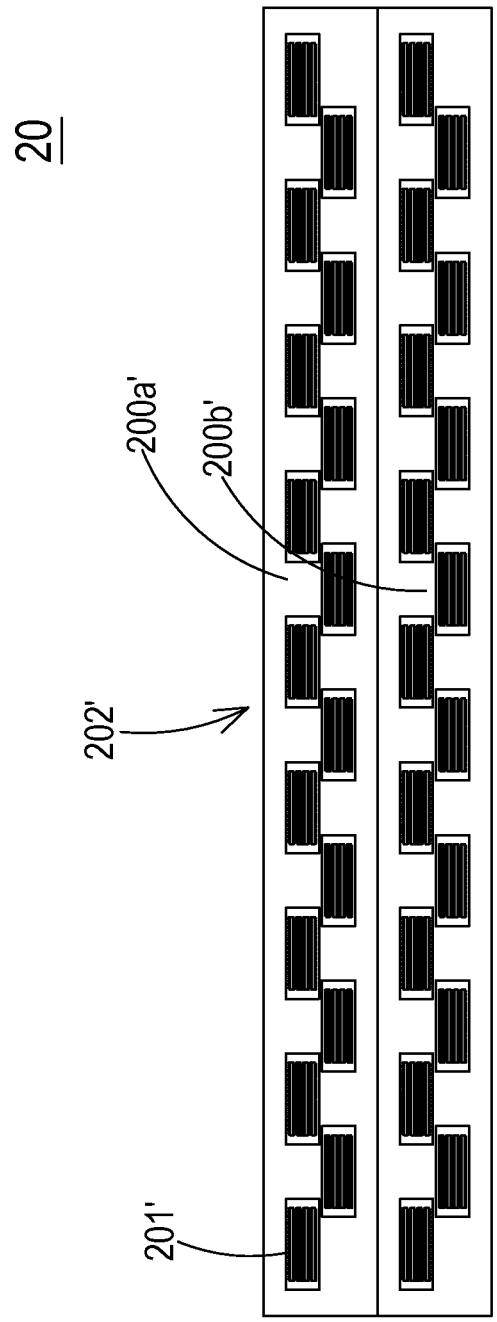
FIG. 8A is a schematic view illustrating a page-width array printing module with two page-width array printing units and having a compensation printing function according to an embodiment of the present invention, in which the inkjet head structures are irreplaceable.

FIG. 8A is a schematic view illustrating a page-width array printing module with two page-width array printing units and having a compensation printing function according to an embodiment of the present invention, in which the inkjet head structures are irreplaceable. As shown in FIG. 8A, the page-width array printing module 20 comprises a printing platform 202', a first page-width array printing unit 200a', and a second page-width array printing unit 200b'. The first page-width array printing unit 200a' and the second page-width array printing unit 200b' have the same configurations. Moreover, the first page-width array printing unit 200a' and the second page-width array printing unit 200b' are arranged side by side and aligned with each other. In this embodiment, the first page-width array printing unit 200a' is used for performing the rapid prototyping width-page printing operation, and the second page-width array printing unit 200b' is used for performing the compensation printing operation. If any liquid ejector (not shown) of the inkjet head structure 201' of the first page-width array printing unit 200a' is abnormal according to the testing result of the automatic detecting process, the liquid ejector of the corresponding inkjet head structure 201' of the second page-width array printing unit 200b' performs the compensation printing operation.

Figure 8B:
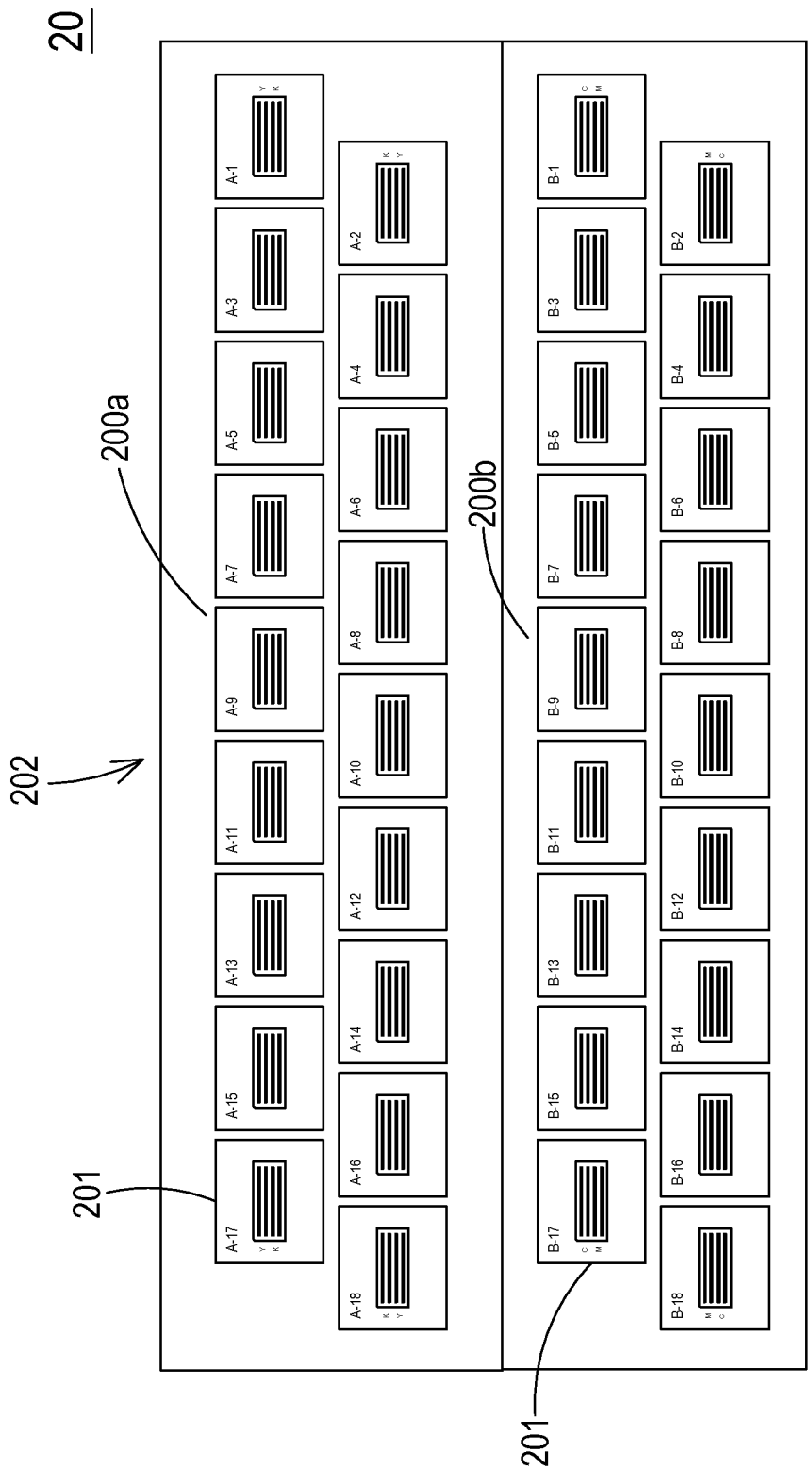
FIG. 8B is a schematic view illustrating a page-width array printing module with two page-width array printing units and having a compensation printing function according to another embodiment of the present invention, in which the inkjet head structures are replaceable.

FIG. 8B is a schematic view illustrating a page-width array printing module with two page-width array printing units and having a compensation printing function according to another embodiment of the present invention, in which the inkjet head structures are replaceable. As shown in FIG. 8B, the page-width array printing module 20 comprises a printing platform 202, a first page-width array printing unit 200a, and a second page-width array printing unit 200b. The first page-width array printing unit 200a and the second page-width array printing unit 200b have the same configurations. Moreover, the first page-width array printing unit 200a and the second page-width array printing unit 200b are arranged side by side and aligned with each other. Similarly, the first page-width array printing unit 200a is used for performing the rapid prototyping width-page printing operation, and the second page-width array printing unit 200b is used for performing the compensation printing operation. If any liquid ejector (not shown) of the inkjet head structure 201 of the first page-width array printing unit 200a is abnormal according to the testing result of the automatic detecting process, the liquid ejector of the corresponding inkjet head structure 201 of the second page-width array printing unit 200b performs the compensation printing operation.

Figure 8D:
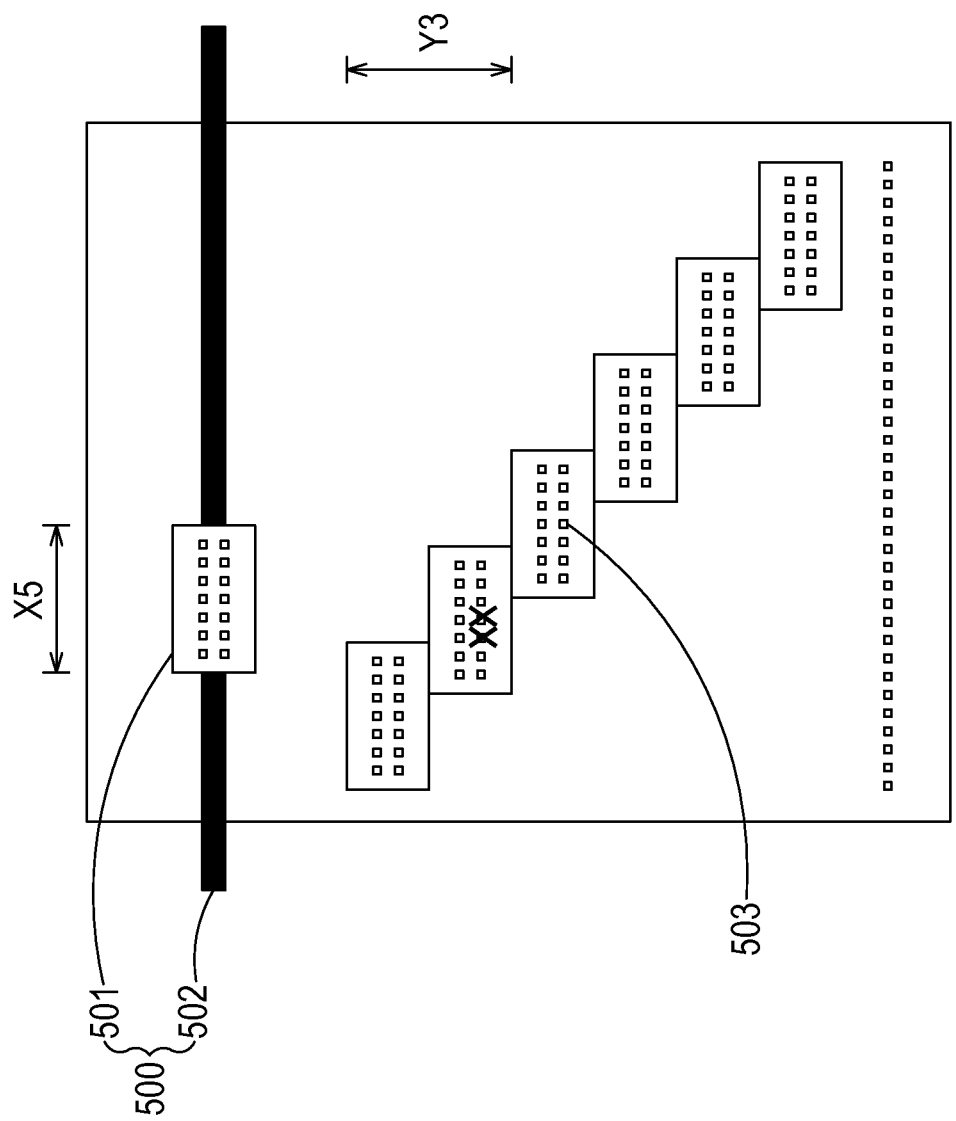
FIG. 8D is a schematic view illustrating the actions of the dynamic compensation module of FIG. 8C.

Although the page-width array printing module 20 with at least two parallel page-width array printing units are effective to perform the compensation printing operation, the additional page-width array printing unit increases the fabricating cost. For solving the above drawbacks, the rapid prototyping apparatus 2 may further comprise a dynamic compensation module for performing the compensation printing operation. FIG. 8C is a schematic view illustrating a dynamic compensation module for performing the compensation printing operation according to an embodiment of the present invention. FIG. 8D is a schematic view illustrating the actions of the dynamic compensation module of FIG. 8C. As shown in FIGS. 8C and 8D, the dynamic compensation module 500 comprises at least one inkjet head structure 501, a transmission mechanism (not shown), and a transmission shaft 502. The configuration of the inkjet head structure 501 is similar to the configuration of the above inkjet head structure 201. The inkjet head structure 501 is driven by the transmission mechanism. Consequently, the inkjet head structure 501 is horizontally moved on the transmission shaft 502 along the direction X5 in the reciprocating motion. Moreover, the dynamic compensation module 500 may be moved along the direction Y3 in the reciprocating motion. Consequently, the dynamic compensation module 500 can be moved to an optimal position in order to repair the clogged or damaged nozzles. In an embodiment, the dynamic compensation module 500 comprises a single inkjet head structure 501. In another embodiment, the dynamic compensation module 500 comprises plural inkjet head structures 501. It is noted that the number of the inkjet head structures 501 and the positions of the inkjet head structures 501 may be varied according to the practical requirements.

From the above descriptions, the present invention provides a rapid prototyping apparatus with a page-width array printing module. The page-width array printing module and a construction chamber of the construction platform are movable relative to each other. Consequently, a rapid prototyping width-page printing operation may be performed in the construction chamber. Moreover, the number and the positions of the construction material supply containers may be determined according to the practical requirements. More especially, the page-width array printing module has diverse configurations for performing a monochromatic printing operation, a multi-slot monochromatic printing operation or a polychromatic printing operation. By the rapid prototyping width-page printing operation, the speed and efficiency of forming the three-dimensional object will be largely enhanced. Moreover, the rapid prototyping apparatus comprises a printing quality detecting module for quickly and accurately detecting whether the nozzles of the page-width array printing module are abnormal. By a feedback compensation mechanism, the compensation printing operation is performed. Consequently, the quality of the three-dimensional object is enhanced. In other words, the rapid prototyping apparatus of the present invention is effective to produce the three-dimensional object with good quality at a faster speed.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A rapid prototyping apparatus, comprising:
    a construction platform comprising a construction chamber;
    a movable platform disposed above the construction platform, wherein the movable platform and the construction platform are movable relative to each other, so that a construction material is pushed to the construction chamber; and
    a page-width array printing module comprising at least one printing platform and plural inkjet head structures, wherein the printing platform is installed on the movable platform, and the printing platform and the movable platform are synchronously moved along a single direction in a reciprocating motion, wherein the plural inkjet head structures are installed on the printing platform and collaboratively defined as at least one page-width array printing unit, and the plural inkjet head structures of the page-width array printing unit comprise respective inkjet chips, wherein the inkjet chips are disposed on the printing platform and arranged in plural rows and in a staggered form, so that a printing width of the inkjet chips is larger than or equal to a width of a printed pattern, wherein at least one monochromatic print liquid is introduced into the construction chamber from the plural inkjet head structures, so that a rapid prototyping width-page printing operation is performed.

2. The rapid prototyping apparatus according to claim 1, wherein each of the inkjet chips of the page-width array printing unit comprises at least one liquid supply slot, wherein plural liquid ejectors are located at bilateral sides of the liquid supply slot along a long axis of the liquid supply slot,
    wherein there is an overlap region between two adjacent inkjet chips in two adjacent rows, and the inkjet chips of the two adjacent rows in the overlap region are aligned with each other.

3. The rapid prototyping apparatus according to claim 2, wherein a drop of the monochromatic print liquid ejected from the liquid ejector has a specified diameter such that the drop of the monochromatic print liquid covers at least two thirds of a particle surface area of the construction material.

4. The rapid prototyping apparatus according to claim 1, wherein the page-width array printing module comprises two printing platforms,
    wherein the two printing platforms are located at two opposite sides of the construction platform, so that the monochromatic print liquid is ejected from both sides of the construction platform.

5. The rapid prototyping apparatus according to claim 1, further comprising a construction material supply container, wherein the construction material supply container is arranged beside the construction chamber for storing the construction material, wherein while the rapid prototyping width-page printing operation is performed, the construction material is spread from the construction material supply container to the construction chamber.

6. The rapid prototyping apparatus according to claim 5, further comprising two construction material supply containers for storing the construction material, wherein the construction material supply containers are located at two opposite sides of the construction platform, wherein while the rapid prototyping width-page printing operation is performed, the construction material is spread from both sides of the construction platform to the construction platform.

7. The rapid prototyping apparatus according to claim 1, further comprising a construction material supply container, wherein the construction material supply container is formed in the construction platform and arranged beside the construction chamber for storing the construction material, wherein a lift/lower platform is disposed within the construction material supply container for moving the construction material within the construction material supply container along a vertical direction, wherein while the rapid prototyping width-page printing operation is performed, the construction material is guided to the topmost layer by the lift/lower platform, so that the construction material is spread from the construction material supply container to the construction chamber.

8. The rapid prototyping apparatus according to claim 1, further comprising two construction material supply containers, wherein the two construction material supply containers are formed in the construction platform and located at two opposite sides of the construction platform, wherein a lift/lower platform is disposed within each construction material supply container for moving the construction material within the construction material supply container along a vertical direction, wherein while the rapid prototyping width-page printing operation is performed, the construction material is guided to the topmost layer by the lift/lower platform, so that the construction material is spread from the construction material supply containers to both sides of the construction platform.

9. The rapid prototyping apparatus according to claim 1, further comprising a recycling tank, wherein the recycling tank is located at a side of the construction chamber, wherein after the construction material is spread in the construction chamber, an excess mount of construction material is collected by the recycling tank.

10. The rapid prototyping apparatus according to claim 9, further comprising a sieving box, wherein the sieving box is located below the recycling tank and in communication with the recycling tank, wherein the collected construction material from the recycling tank is sieved by the sieving box so as to be recycled for reuse.

11. The rapid prototyping apparatus according to claim 1, further comprising a heater installed on the movable platform, wherein after the construction material is spread in the construction chamber, the construction material is heated by the heater, so that the construction material is formed as a construction layer.

12. The rapid prototyping apparatus according to claim 1, wherein the plural inkjet head structures of each page-width array printing unit are irreplaceable.

13. The rapid prototyping apparatus according to claim 1, wherein the plural inkjet head structures of each page-width array printing unit are replaceable.

14. The rapid prototyping apparatus according to claim 1, wherein the monochromatic print liquid is colorless or monochromatic, wherein the monochromatic print liquid is a binder liquid or a color ink, and the color ink is a pigment-based ink or a dye-based ink.

15. The rapid prototyping apparatus according to claim 1, wherein each of the inkjet chips of the page-width array printing unit comprises at least two liquid supply slots, wherein the monochromatic print liquid is introduced into the at least two liquid supply slots, so that a multi-slot monochromatic printing operation is performed.

16. The rapid prototyping apparatus according to claim 1, wherein each of the inkjet chips of the page-width array printing unit comprises at least two liquid supply slots, wherein different monochromatic print liquids are introduced into the at least two liquid supply slots, so that a polychromatic printing operation is performed.

17. The rapid prototyping apparatus according to claim 12, wherein the printing platform comprises plural liquid supply channels corresponding to respective inkjet chips, wherein each of the inkjet chips of the page-width array printing unit comprises a single liquid supply slot in fluid communication with the corresponding liquid supply channel, wherein the monochromatic print liquid is transmitted through the plural liquid supply channels, so that a monochromatic printing operation is performed.

18. The rapid prototyping apparatus according to claim 12, wherein the printing platform comprises plural liquid supply channels, and the plural liquid supply channels are not in fluid communication with each other, wherein each of the liquid supply channels is correlated with plural rows of inkjet chips in a staggered form, wherein each of the inkjet chips of the page-width array printing unit comprises plural liquid supply slots in fluid communication with the corresponding liquid supply channels, wherein the monochromatic print liquid is transmitted through the plural liquid supply channels, so that a multi-slot monochromatic printing operation is performed.

19. The rapid prototyping apparatus according to claim 12, wherein the printing platform comprises plural liquid supply channels, and the plural liquid supply channels are not in fluid communication with each other, wherein each of the liquid supply channels is correlated with plural rows of inkjet chips in a staggered form, wherein each of the inkjet chips of the page-width array printing unit comprises plural liquid supply slots in fluid communication with the corresponding liquid supply channels, wherein different monochromatic print liquids are transmitted through the plural liquid supply channels, so that a polychromatic printing operation is performed.

20. The rapid prototyping apparatus according to claim 1, further comprising a continuous liquid supply device, wherein the continuous liquid supply device comprises plural liquid containers for storing the at least one monochromatic print liquid, wherein the continuous liquid supply device are in fluid communication with the plural inkjet head structures of the page-width array printing module through at least one external pipe for continuously providing the at least one monochromatic print liquid, thereby performing the rapid prototyping width-page printing operation.

21. The rapid prototyping apparatus according to claim 1, further comprising a printing quality detecting module, wherein before or during a process of performing the rapid prototyping width-page printing operation, a nozzle test pattern printed out by the page-width array printing module is detected by an image capture module of the printing quality detecting module, wherein if a failed-print part of the nozzle test pattern corresponding to one of the inkjet chips is detected, a compensation printing operation is performed.

22. The rapid prototyping apparatus according to claim 21, wherein the printing quality detecting module comprises the image capture module and a dustproof cover, wherein the image capture module is installed on the construction platform and disposed within the dustproof cover, wherein the image capture module is covered by the dustproof cover, so that the image capture module is not contaminated by surrounding dust, wherein when the image capture module is moved to a position over the construction chamber by a driving mechanism, the nozzle test pattern printed out by the page-width array printing module is detected by the image capture module.

23. The rapid prototyping apparatus according to claim 21, wherein the image capture module is an optical detecting module, wherein after intensities of reflected light beams from the nozzle test pattern corresponding to odd-row nozzles and even-row nozzles are detected by the optical detecting module, a digital data corresponding to the nozzle test pattern is acquired, wherein the failed-print part is realized according to the digital data.

24. The rapid prototyping apparatus according to claim 21, wherein the image capture module is a scanning module, wherein after the nozzle test pattern is scanned by the scanning module, a digital data corresponding to the nozzle test pattern is acquired, wherein the failed-print part is realized according to the digital data.

25. The rapid prototyping apparatus according to claim 21, wherein the plural inkjet head structures installed on the printing platform are collaboratively defined as at least two parallel page-width array printing units, wherein the at least two parallel page-width array printing units have the same configurations, wherein if any of the inkjet head structures of one page-width array printing unit has a failed-print part, a compensation printing operation is performed by another page-width array printing unit.

26. The rapid prototyping apparatus according to claim 21, further comprising a dynamic compensation module, wherein the dynamic compensation module is installed on the movable platform, and the dynamic compensation module comprises at least one inkjet head structure with the same configuration as the inkjet head structure of the page-width array printing unit, wherein if any of the inkjet head structures of the page-width array printing unit has a failed-print part, the dynamic compensation module is moved relative to the page-width array printing unit so as to perform a compensation printing operation.

27. A rapid prototyping apparatus, comprising:
a construction platform comprising a construction chamber;
a movable platform disposed above the construction platform for pushing a construction material to the construction chamber; and
a page-width array printing module comprising at least one printing platform and plural inkjet head structures, wherein the page-width array printing module and the construction chamber are movable relative to each other so as to perform a rapid prototyping width-page printing operation, wherein the printing platform is installed on the movable platform, the plural inkjet head structures are installed on the printing platform and collaboratively defined as at least one page-width array printing unit, and the plural inkjet head structures of the page-width array printing unit comprise respective inkjet chips, wherein the inkjet chips are disposed on the printing platform and arranged in plural rows and in a staggered form, so that a printing width of the inkjet chips is larger than or equal to a width of a printed pattern, wherein a monochromatic print liquid is introduced into the construction chamber from the plural inkjet head structures, so that the rapid prototyping width-page printing operation is performed.

28. The rapid prototyping apparatus according to claim 27, wherein the page-width array printing module and the construction chamber are movable relative to each other, and the page-width array printing module is installed on the movable platform, wherein while the rapid prototyping width-page printing operation is performed, the page-width array printing module and the movable platform are synchronously moved along a single direction in a reciprocating motion and the construction chamber is immobile.

29. The rapid prototyping apparatus according to claim 27, wherein the page-width array printing module and the construction chamber are movable relative to each other, and the page-width array printing module is installed on the movable platform, wherein while the rapid prototyping width-page printing operation is performed, the page-width array printing module and the movable platform are connected with each other and immobile, and the construction chamber of the construction platform is moved along a single direction in a reciprocating motion so as to pass through the page-width array printing module.

30. The rapid prototyping apparatus according to claim 27, wherein the page-width array printing module and the construction chamber are movable relative to each other, wherein the page-width array printing module is installed on the movable platform, the page-width array printing module and the movable platform are synchronously, and the construction chamber of the construction platform is movable, wherein while the rapid prototyping width-page printing operation is performed, the page-width array printing module and the construction chamber are moved relative to each other along a single direction in a reciprocating motion.

* * * * *